(12) United States Patent
Morinaka et al.

(10) Patent No.: US 10,211,480 B2
(45) Date of Patent: Feb. 19, 2019

(54) ELECTROLYTIC SOLUTION FOR NON-AQUEOUS ELECTROLYTE BATTERY AND NON-AQUEOUS ELECTROLYTE BATTERY USING THE SAME

(71) Applicant: CENTRAL GLASS CO., LTD., Ube-shi, Yamaguchi (JP)

(72) Inventors: Takayoshi Morinaka, Ube (JP); Makoto Kubo, Ube (JP); Wataru Kawabata, Ube (JP); Kenta Yamamoto, Saitama (JP); Mikihiro Takahashi, Ube (JP)

(73) Assignee: CENTRAL GLASS CO., LTD., Yamaguchi (JP)

( * ) Notice: Subject to any disclaimer, the term of this patent is extended or adjusted under 35 U.S.C. 154(b) by 26 days.

(21) Appl. No.: 15/529,738

(22) PCT Filed: Dec. 1, 2015

(86) PCT No.: PCT/JP2015/083803
§ 371 (c)(1),
(2) Date: May 25, 2017

(87) PCT Pub. No.: WO2016/088773
PCT Pub. Date: Jun. 9, 2016

(65) Prior Publication Data
US 2017/0331143 A1    Nov. 16, 2017

(30) Foreign Application Priority Data

Dec. 1, 2014   (JP) .................... 2014-243288

(51) Int. Cl.
| | |
|---|---|
| *H01M 10/0567* | (2010.01) |
| *H01M 10/052* | (2010.01) |
| *H01M 10/054* | (2010.01) |
| *H01M 10/0563* | (2010.01) |
| *H01M 10/0568* | (2010.01) |
| *H01M 10/0569* | (2010.01) |

(52) U.S. Cl.
CPC ....... *H01M 10/052* (2013.01); *H01M 10/054* (2013.01); *H01M 10/0563* (2013.01); *H01M 10/0567* (2013.01); *H01M 10/0568* (2013.01); *H01M 10/0569* (2013.01); *H01M 2300/002* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2014/0193706 A1 | 7/2014 | Morinaka et al. | |
| 2015/0118579 A1 | 4/2015 | Kondo et al. | |
| 2017/0204124 A1* | 7/2017 | Takahashi | ........... H01M 10/052 |

FOREIGN PATENT DOCUMENTS

| | | |
|---|---|---|
| CN | 102816096 | 12/2012 |
| CN | 104151206 | 11/2014 |
| JP | 2000-123867 | 4/2000 |
| JP | 2013-30465 | 2/2013 |
| JP | 2013-51122 | 3/2013 |
| TW | 201401613 | 1/2014 |

OTHER PUBLICATIONS

International Search Report dated Jan. 12, 2016 International (PCT) Application No. PCT/JP2015/083803.
Office Action dated Aug. 30, 2016 in corresponding Taiwan Application No. 104140196, with English translation.

* cited by examiner

*Primary Examiner* — Jonathan Crepeau
(74) *Attorney, Agent, or Firm* — Wenderoth, Lind & Ponack, L.L.P.

(57) ABSTRACT

An electrolytic solution for a non-aqueous electrolyte battery is provided, which is capable of providing an excellent low-temperature output characteristic at −30° C. or lower and an excellent cycle characteristic at high temperatures of 45° C. or higher. For example, the electrolytic solution contains the following salt having a divalent imide anion.

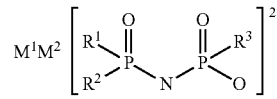

wherein $R^1$ to $R^3$ represent a fluorine atom or an alkoxy group, for example, and $M^1$ and $M^2$ represent protons or metal cations, for example.

11 Claims, No Drawings

ELECTROLYTIC SOLUTION FOR NON-AQUEOUS ELECTROLYTE BATTERY AND NON-AQUEOUS ELECTROLYTE BATTERY USING THE SAME

TECHNICAL FIELD

The present invention relates to an electrolytic solution to be used for a non-aqueous electrolyte secondary battery excellent in a cycle characteristic and a low-temperature characteristic, as well as a non-aqueous electrolyte battery using the same.

BACKGROUND ART

In recent years, power storage systems to be applied for small apparatuses that need high energy density, such as information technology-related apparatuses or communication apparatuses, specifically, personal computers, video cameras, digital still cameras, and cell phones, and power storage systems to be applied for large apparatuses that need power, such as electric vehicles, hybrid vehicles, auxiliary power for fuel cell vehicles, and energy storage have received attention. As a candidate therefor, non-aqueous electrolyte batteries such as a lithium ion battery, a lithium battery, a lithium ion capacitor, or a sodium ion battery, have been actively developed.

Many of these non-aqueous electrolyte batteries have already been put into practical use, however, none of these batteries are sufficient for various applications in terms of respective characteristics. In particular, a battery to be applied for a vehicle such as an electric vehicle is required to have a high input output characteristic even in a cold season. Hence, improvement in a low-temperature characteristic is important. Moreover, such a battery is required to have a high-temperature cycle characteristic such that it is capable of maintaining its characteristics (less increase in internal resistance) even when charging and discharging are performed repeatedly under a high-temperature environment.

As a means for improving the high-temperature characteristic, and the battery characteristics (a cycle characteristic) wherein charging and discharging are repeated, optimization of various battery components including active materials of positive electrodes and negative electrodes has been studied. A non-aqueous electrolytic solution-related technology is not an exception, and it has been proposed that deterioration due to decomposition of an electrolytic solution on the surface of an active positive electrode or an active negative electrode is suppressed by various additives. For example, Patent Document 1 proposes that battery characteristics are improved by the addition of a vinylene carbonate to an electrolytic solution. However, this is problematic in that battery characteristics at high temperatures are improved, but the internal resistance is significantly increased to lower the low-temperature characteristic. Furthermore, a number of examinations on the addition of an imide salt to an electrolytic solution have been conducted. For example, there have been proposed a method (Patent Document 2) for suppressing deterioration in a high-temperature cycle characteristic or a high-temperature storage characteristic by combining a specific sulfonimide salt or a phosphoryl imide salt with an oxalato complex, and a method (Patent Document 3) for suppressing deterioration in a cycle characteristic or an output characteristic by combining a specific sulfonimide salt with a fluorophosphate.

PRIOR ART DOCUMENTS

Patent Documents

Patent Document 1: JP Patent Publication (Kokai) No. 2000-123867A
Patent Document 2: JP Patent Publication (Kokai) No. 2013-051122A
Patent Document 3: JP Patent Publication (Kokai) No. 2013-030465A

SUMMARY OF THE INVENTION

Problems to be Solved by the Invention

A low-temperature characteristic and a high-temperature cycle characteristic provided by non-aqueous electrolyte batteries using non-aqueous electrolytic solutions disclosed in the prior art documents are not completely satisfactory and still remain to be improved. The present invention provides an electrolytic solution to be used for a non-aqueous electrolyte battery capable of providing a good low-temperature output characteristic at −30° C. or lower and a good cycle characteristic at high temperatures of 45° C. or higher, as well as a non-aqueous electrolyte battery using the same.

Means for Solving the Problems

Intensive studies have been made in order to solve the problems, and as a result, the present inventors have discovered that a non-aqueous electrolyte battery can provide a good low-temperature output characteristic and a high-temperature cycle characteristic, by introducing a specific salt having a divalent imide anion with a specific structure into a non-aqueous electrolytic solution to be used for a non-aqueous electrolyte battery comprising a non-aqueous solvent and a solute contains and then using the resultant non-aqueous electrolyte in the non-aqueous electrolyte battery. Based on this finding, the present invention has been completed.

Specifically, the present invention provides an electrolytic solution to be used for a non-aqueous electrolyte battery (hereafter, also referred to as simply "non-aqueous electrolytic solution" or "electrolytic solution") comprising a non-aqueous solvent, a solute, and at least one type of salt having a divalent imide anion (hereafter, also referred to as simply "salt having an imide anion") represented by any one of the following general formulae (1) to (4).

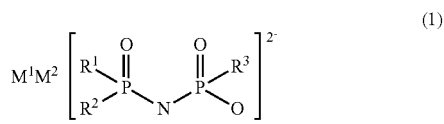

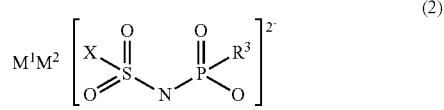

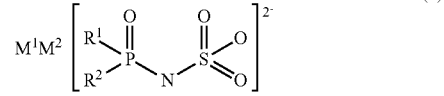

-continued

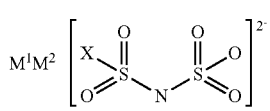
(4)

wherein, in formulae (1) to (3), $R^1$ to $R^3$ each independently represent a fluorine atom or an organic group selected from a linear or branched C1-10 alkoxy group, a C2-10 alkenyloxy group, a C2-10 alkynyloxy group, a C3-10 cycloalkoxy group, a C3-10 cycloalkenyloxy group and a C6-10 aryloxy group, wherein a fluorine atom, an oxygen atom or an unsaturated bond may also be present in the organic group;

in formulae (2) and (4), X represents a fluorine atom or an organic group selected from a linear or branched C1-10 alkyl group, a C2-10 alkenyl group, a C2-10 alkynyl group, a C3-10 cycloalkyl group, a C3-10 cycloalkenyl group, a C6-10 aryl group, a linear or branched C1-10 alkoxy group, a C2-10 alkenyloxy group, a C2-10 alkynyloxy group, a C3-10 cycloalkoxy group, a C3-10 cycloalkenyloxy group and a C6-10 aryloxy group, wherein a fluorine atom, an oxygen atom, or an unsaturated bond may also be present in the organic group; and $M^1$ and $M^2$ each independently represent a proton, a metal cation or an onium cation.

The action mechanism for improving battery characteristics in accordance with the present invention is not clearly understood. However, it is considered that a salt having an imide anion of the present invention is partially decomposed at the boundary between a positive electrode and an electrolytic solution, and the boundary between a negative electrode and the electrolytic solution, so as to form a film. The film prevents the decomposition of a non-aqueous solvent or a solute by inhibiting a direct contact between the non-aqueous solvent or the solute with an active material, so as to suppress the deterioration of the battery performances. While the mechanism thereof is unclear, it is important that an imide anion has a phosphate ion site ($-P(=O)R^3O^-$) or a sulfonate ion site ($-SO_3^-$). It is considered that incorporation of a phosphate ion site or a sulfonate ion site into the above film results in uneven distribution of electric charge of the thus formed film, which leads to a high lithium conductivity; that is, a low resistance (film having a good output characteristic). Furthermore, the above effect is considered to be that an imide anion contains a site with a high electron-withdrawing property (e.g., a fluorine atom and a fluorine-containing alkoxy group) to further increase the degree of uneven distribution of electric charge, so as to form a film with a lower resistance (film having a better output characteristic). For this reason, it is assumed that an effect of improving a high-temperature cycle characteristic and a low-temperature output characteristic is exerted by the non-aqueous electrolytic solution containing a salt having an imide anion according to the present invention.

The salt having an imide anion preferably has at least one P—F bond or S—F bond, in order to have a better low-temperature characteristic. The salt further preferably has as many P—F bonds or S—F bonds as possible, since the higher the number of P—F bonds or S—F bonds in the salt, the more the low-temperature characteristic can be improved.

It is preferable that the above $R^1$ to $R^3$ are a fluorine atom or an organic group selected from the group consisting of a C2-10 alkenyloxy group and a C2-10 alkynyloxy group, in order to obtain a better high-temperature cycle characteristic.

Furthermore, the number of carbons of the above alkenyloxy group is preferably 6 or less. The higher number of carbons tends to provide a relatively higher internal resistance when a film is formed on an electrode. The number of carbons is preferably 6 or less because the resulting internal resistance tends to be low. The alkenyloxy group is particularly preferably selected from the group consisting of a 1-propenyloxy group, a 2-propenyloxy group, and a 3-butenyloxy group in order to obtain a non-aqueous electrolyte battery excellent in a high-temperature cycle characteristic and a low-temperature output characteristic.

Furthermore, the number of carbons of the above alkynyloxy group is preferably 6 or less. The higher number of carbons tends to provide a relatively high internal resistance when a film is formed on an electrode. The number of carbons is preferably 6 or less, because the resulting internal resistance tends to be low. The alkynyloxy group is particularly preferably selected from the group consisting of a 2-propynyloxy group, and 1,1-dimethyl-2-propynyloxy group in order to obtain a non-aqueous electrolyte battery excellent in a high-temperature cycle characteristic and a low-temperature output characteristic.

The above X is preferably a fluorine atom or an organic group selected from the group consisting of a C1-10 alkoxy group, a C2-10 alkenyloxy group, and a C2-10 alkynyloxy group in order to obtain a better high-temperature cycle characteristic.

The number of carbons of the above alkoxy group is preferably 6 or less. The higher number of carbons tends to provide a relatively high internal resistance when a film is formed on an electrode. The number of carbons is preferably 6 or less, because the resulting internal resistance tends to be low. The alkoxy group is particularly preferably selected from the group consisting of a methoxy group, an ethoxy group, and a propoxy group in order to obtain a non-aqueous electrolyte battery excellent in a high-temperature cycle characteristic and a low-temperature output characteristic.

The number of carbons of the above alkenyloxy group is preferably 6 or less. The higher number of carbons tends to provide a relatively high internal resistance when a film is formed on an electrode. The number of carbons is preferably 6 or less, because the resulting internal resistance tends to be low. The alkenyloxy group is particularly preferably selected from the group consisting of a 1-propenyloxy group, a 2-propenyloxy group, and a 3-butenyloxy group in order to obtain a non-aqueous electrolyte battery excellent in a high-temperature cycle characteristic and a low-temperature output characteristic.

The number of carbons of alkynyloxy group is preferably 6 or less. The high number of carbons tends to provide a relatively high internal resistance when a film is formed on an electrode. The number of carbons is preferably 6 or less because the resulting internal resistance tends to be low. The alkynyloxy group is particularly preferably selected from the group consisting of a 2-propynyloxy group and a 1,1-dimethyl-2-propynyloxy group in order to obtain a non-aqueous electrolyte battery excellent in a high-temperature cycle characteristic and a low-temperature output characteristic.

Counter cations $M^1$ and $M^2$ of an imide anion in the above salt preferably represent protons, alkali metal cations, or onium cations. Of these, in view of solubility and ion electric conductivity in a non-aqueous electrolytic solution, a counter cation is more preferably at least one cation selected from the group consisting of a proton, a lithium ion, a sodium ion, a potassium ion, a tetraalkylammonium ion, and a tetraalkylphosphonium ion.

The lower limit of the concentration of the salt is preferably 0.01 mass % or more, more preferably 0.05 mass % or more, and further more preferably 0.1 mass % or more relative to the total amount of an electrolytic solution for a non-aqueous electrolyte battery. Furthermore, the upper limit of the concentration is preferably 5.0 mass % or less, more preferably 4.0 mass % or less, and further more preferably 3.0 mass % or less. The concentration that is lower than 0.01 mass % makes it difficult to sufficiently obtain an effect of improving battery characteristics, so that such a concentration is not preferred. On the other hand, the concentration of higher than 5.0 mass % does not improve the effect further and thus is not only useless, but also such concentration tends to increase the viscosity of the electrolytic solution and decrease the ionic conductance, which leads to easily increase the resistance and deteriorate the battery performance, and thus is not preferred. These salts may be used singly as long as its concentration does not exceed 5.0 mass %, or they can be used as a combination of two or more kinds of the salts at any ratio, depending on applications.

The above solute is preferably at least one solute selected from the group consisting of $LiPF_6$, $LiPF_2(C_2O_4)_2$, $LiPF_4(C_2O_4)$, $LiP(C_2O_4)_3$, $LiBF_2(C_2O_4)$ $LiB(C_2O_4)_2$, $LiPO_2F_2$, $LiN(F_2PO)_2$, $LiN(FSO_2)_2$, $LiN(CF_3SO_2)_2$, $LiBF_4$, $NaPF_6$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaN(CF_3SO_2)_2$, and $NaBF_4$.

The above non-aqueous solvent is preferably at least one solvent selected from the group consisting of a cyclic carbonate, a linear carbonate, a cyclic ester, a linear ester, a cyclic ether, a linear ether, a sulfone compound, a sulfoxide compound, and an ionic liquid.

The present invention further provides a non-aqueous electrolyte battery comprising at least a positive electrode, a negative electrode, and the above electrolytic solution for a non-aqueous electrolyte battery.

Effect of the Invention

When the present electrolytic solution is used for a non-aqueous electrolyte battery, the resultant battery can exert a good low-temperature output characteristic at −30° C. or lower and a good cycle characteristic at high temperatures of 45° C. or higher.

MODES FOR CARRYING OUT THE INVENTION

The present invention will be explained in detail as follows. However, explanations for constituent features described below are merely examples of the embodiments of the present invention, and the present invention is not limited to these specific contents and may be variously modified within the disclosure of the present specification.

The present electrolytic solution is an electrolytic solution for a non-aqueous electrolyte battery characterized by comprising a non-aqueous solvent, a solute, and at least one salt having a divalent imide anion, which is represented by any one of the general formulae (1) to (4).

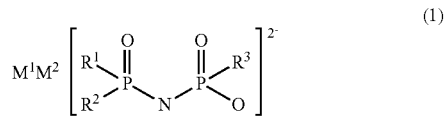

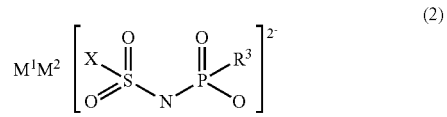

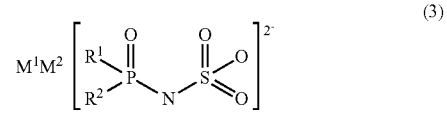

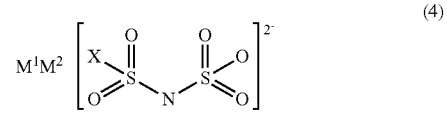

In formulae (1) to (3), $R^1$ to $R^3$ each independently represent a fluorine atom or an organic group selected from a linear or branched C1-10 alkoxy group, a C2-10 alkenyloxy group, a C2-10 alkynyloxy group, a C3-10 cycloalkoxy group, a C3-10 cycloalkenyloxy group and a C6-10 aryloxy group, wherein a fluorine atom, an oxygen atom, or an unsaturated bond may be present in the organic group.

In formulae (2) and (4), X represents a fluorine atom or an organic group selected from a linear or branched C1-10 alkyl group, a C2-10 alkenyl group, a C2-10 alkynyl group, a C3-10 cycloalkyl group, a C3-10 cycloalkenyl group, a C6-10 aryl group, a linear or branched C1-10 alkoxy groups, a C2-10 alkenyloxy group, a C2-10 alkynyloxy group, a C3-10 cycloalkoxy group, a C3-10 cycloalkenyloxy group and a C6-10 aryloxy group, wherein a fluorine atom, an oxygen atom or an unsaturated bond may be also present in the organic group.

$M^1$ and $M^2$ as counter cations each independently represent a proton, a metal cation or an onium cation.

Examples of the counter cation include a proton, alkali metal cations such as a lithium ion, a sodium ion, and a potassium ion, alkaline earth metal cations such as a magnesium ion and a calcium ion, onium cations such as tetramethyl ammonium, tetraethyl ammonium, and tetrabutylphosphonium (when counter cations are monovalent cations, 2 kinds of the counter cations may be mixed. Moreover, for example, if $M^1$ is a divalent cation, $M^2$ does not exist).

In the above formulae (1) to (3), examples of those represented by $R^1$ to $R^3$, specifically: examples of alkoxy groups include C1-10 alkoxy groups and fluorine-containing alkoxy groups such as a methoxy group, an ethoxy group, a propoxy group, an isopropoxy group, a butoxy group, a secondary butoxy group, a tertiary butoxy group, a pentyloxy group, a trifluoromethoxy group, a 2,2-difluoroethoxy group, a 2,2,2-trifluoroethoxy group, a 2,2,3,3-tetrafluoropropoxy group and a 1,1,1,3,3,3-hexafluoroisopropoxy group; examples of alkenyloxy groups include C2-10 alkenyloxy groups and fluorine-containing alkenyloxy groups such as a vinyloxy group, a 1-propenyloxy group, a 2-propenyloxy group, an isopropenyloxy group, a 2-butenyloxy group, a 3-butenyloxy group and a 1,3-butadienyloxy group; examples of alkynyloxy groups include C2-10 alkynyloxy groups and fluorine-containing alkynyloxy groups such as an ethynyloxy group, a 2-propynyloxy group, and a 1,1-dimethyl-2-propynyloxy group; examples of cycloalkoxy groups include C3-10 cycloalkoxy groups and fluorine-containing cycloalkoxy groups such as a cyclopentyloxy group and a cyclohexyloxy group; examples of cycloalkenyloxy groups include C3-10 cycloalkenyloxy groups and fluorine-containing cycloalkenyloxy groups such as a cyclopentenyloxy group and a cyclohexenyloxy group; and examples of aryloxy groups include C6-10 aryloxy groups and fluorine-containing aryloxy groups such as a phenyloxy group, a tolyloxy group and a xylyloxy group.

In the above general formulae (2) and (4), those represented by X, specifically: examples of alkyl groups include C1-10 alkyl groups and fluorine-containing alkyl groups such as a methyl group, an ethyl group, a propyl group, an isopropyl group, a butyl group, a secondary butyl group, a tertiary butyl group, a pentyl group, a trifluoromethyl group, a 2,2-difluoroethyl group, a 2,2,2-trifluoroethyl group, a 2,2,3,3-tetrafluoropropyl group and a 1,1,1,3,3,3-hexafluoroisopropyl group; examples of alkenyl groups include C2-10 alkenyl groups and fluorine-containing alkenyl groups such as a vinyl group, a 1-propenyl group, a 2-propenyl group, an isopropenyl group, a 2-butenyl group, a 3-butenyl group and a 1,3-butadienyl group; examples of alkynyl groups include C2-10 alkynyl groups and fluorine-containing alkynyl groups such as an ethynyl group, a 2-propynyl group and 1,1-dimethyl-2-propynyl group; examples of cycloalkyl groups include C3-10 cycloalkyl groups and fluorine-containing cycloalkyl groups such as a cyclopentyl group and a cyclohexyl group; examples of cycloalkenyl groups include C3-10 cycloalkenyl groups and fluorine-containing cycloalkenyl groups such as a cyclopentenyl group and a cyclohexenyl group; and examples of aryl groups include C6-10 aryl groups and fluorine-containing aryl groups such as a phenyl group, a tolyl group and a xylyl group.

Examples of the divalent imide anions described in the above general formulae (1) to (4) include, more specifically, the following compounds No. 1 to No. 18. However, the imide anions to be used in the present invention are not limited in any way by the following examples.

Compound No. 1

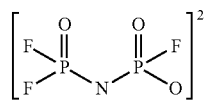

Compound No. 2

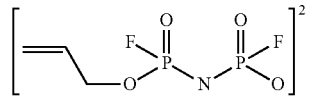

Compound No. 3

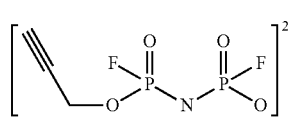

Compound No. 4

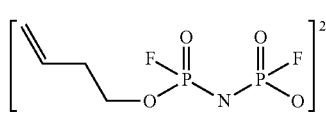

Compound No. 5

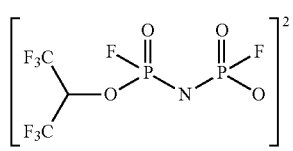

-continued

Compound No. 6

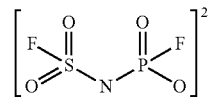

Compound No. 7

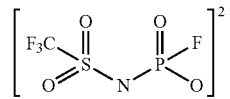

Compound No. 8

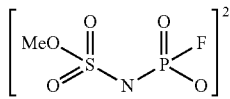

Compound No. 9

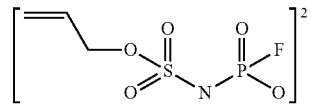

Compound No. 10

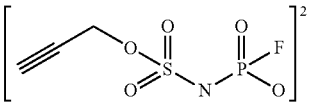

Compound No. 11

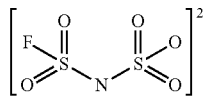

Compound No. 12

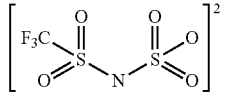

Compound No. 13

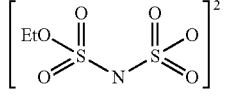

Compound No. 14

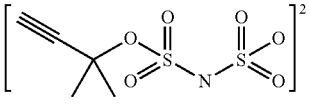

Compound No. 15

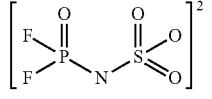

Compound No. 16

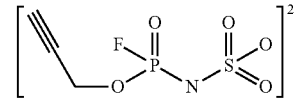

Compound No. 17

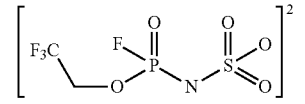

-continued

Compound No. 18

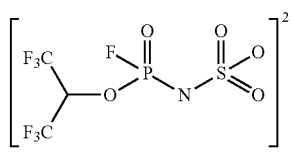

The salts having the imide anions, which are represented by any one of the above general formulae (1) to (4), can be produced by various methods. While production processes therefor are not limited, for example, the salts can be obtained by reacting the corresponding phosphoramide ($H_2NP(=O) R^3O^-$) or sulfamic acid ($H_2NSO_3^-$) with the corresponding phosphonyl chloride ($P(=O)R^1R^2Cl$) or sulfonyl chloride ($XSO_2Cl$) in the presence of an organic base or an inorganic base.

The kinds of the non-aqueous solvent to be used for the electrolytic solution of the present invention are not particularly limited, and any kinds of the non-aqueous solvents can be used. The specific examples thereof include cyclic carbonates such as propylene carbonate, ethylene carbonate, and butylene carbonate, linear carbonates such as diethyl carbonate, dimethyl carbonate, and ethyl methyl carbonate, cyclic esters such as γ-butyrolactone and γ-valerolactone, linear esters such as methyl acetate and methyl propionate, cyclic ethers such as tetrahydrofuran, 2-methyltetrahydrofuran, and dioxane, linear ethers such as dimethoxyethane and diethylether, and sulfone compounds or sulfoxide compounds such as dimethyl sulfoxide and sulfolane. Another example thereof in a category differing from non-aqueous solvents is an ionic liquid and the like. Furthermore, the non-aqueous solvents to be used in the present invention may be used singly or a combination of two or more solvents mixed at any ratio depending on applications. Of these examples, in view of electrochemical stability against its oxidation-reduction and chemical stability relating to heat or reaction with the above solute, particularly propylene carbonate, ethylene carbonate, diethyl carbonate, dimethyl carbonate, and ethyl methyl carbonate are preferred.

The kinds of the above solutes to be used for the electrolytic solution for a non-aqueous electrolyte battery of the present invention are not particularly limited, and any electrolytic salts can be used. The specific examples thereof include: in the case of a lithium battery and a lithium ion battery, electrolytic salts represented by $LiPF_6$, $LiPF_2(O_2C_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiBF_4$, $LiClO_4$, $LiAsF_6$, $LiSbF_6$, $LiCF_3SO_3$, $LiN(C_2F_5SO_2)_2$, $LiN(CF_3SO_2)(C_4F_9SO_2)$, $LiC(CF_3SO_2)_3$, $LiPF_3(C_3F_7)_3$, $LiB(CF_3)_4$, and $LiBF_3(C_2F_5)$; and in the case of a sodium ion battery, electrolytic salts represented by $NaPF_6$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaN(CF_3SO_2)_2$, $NaBF_4$, $NaClO_4$, $NaAsF_6$, $NaSbF_6$, $NaCF_3SO_3$, $NaN(C_2F_5SO_2)_2$, $NaN(CF_3SO_2)(C_4F_9SO_2)$, $NaC(CF_3SO_2)_3$, $NaPF_3(C_3F_7)_3$, $NaB(CF_3)_4$, and $NaBF_3(O_2F_5)$. These solutes may be used singly or in a combination of two or more solutes mixed at any ratio depending on applications. Of these examples, in view of energy density, output characteristics, life, and the like for a battery, $LiPF_6$, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiBF_4$, $NaPF_6$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaN(CF_3SO_2)_2$, and $NaBF_4$ are preferred.

A preferable combination of the solutes is, for example, a combination of at least one solute selected from the group consisting of $LiPF_2(C_2O_4)_2$, $LiPF_4(C_2O_4)$, $LiP(O_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, and $LiBF_4$, with $LiPF_6$.

The ratio (molar ratio when $LiPF_6$ is used as 1 mole) generally ranges from 1:0.001 to 1:0.5, and preferably ranges from 1:0.01 to 1:0.2, when at least one solute selected from the group consisting of $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$ and $LiBF_4$ is used in combination with $LiPF_6$ as solutes. The use of solutes in combination at the above ratio can provide an effect of further improving various battery characteristics. On the other hand, if the proportion of $LiPF_6$ is lower than that in the case of 1:0.5, the ionic conductance of the electrolytic solution is lowered, and the resistance tends to increase.

While the concentration of these solutes is not particularly limited, the lower limit thereof is preferably 0.5 mol/L or more, more preferably 0.7 mol/L or more, and further preferably 0.9 mol/L or more. Moreover, the upper limit thereof is preferably 2.5 mol/L or less, more preferably 2.0 mol/L or less, and further preferably 1.5 mol/L or less. In this case, when plural kinds of the solutes are used, the concentration of the total amount of the solutes is preferably within the above range. If the concentration is lower than 0.5 mol/L, ionic conductance is lowered, and the cycle characteristic and output characteristic of the non-aqueous electrolyte battery tend to decrease. On the other hand, if the concentration exceeds 2.5 mol/L, the viscosity of the electrolytic solution for a non-aqueous electrolyte battery is increased, and as a result the ionic conductance tends to decrease. Accordingly, there is a risk of lowering the cycle characteristics and the output characteristics of the non-aqueous electrolyte battery.

When a large amount of the solutes is dissolved at once in a non-aqueous solvent, the liquid temperature may increase because of the heat of the dissolution of the solute(s). If the liquid temperature increases remarkable, the decomposition of the fluorine-containing electrolytic salt is accelerated and thus hydrogen fluoride may be generated. Hydrogen fluoride causes deterioration in battery performance and thus is not preferred. Therefore, while the liquid temperature at which the solute(s) is dissolved in a non-aqueous solvent is not particularly limited, −20° C. to 80° C. is preferably, and 0° C. to 60° C. is more preferably.

The basic constitution of the electrolytic solution for a non-aqueous electrolyte battery of the present invention is as described above. An additive that is generally used may be added at any ratio to the electrolytic solution for a non-aqueous electrolyte battery of the present invention, as long as the gist of the present invention is not impaired. Specific examples thereof include compounds having an effect of preventing overcharge, an effect of forming a negative electrode film, and an effect of protecting a positive electrode, such as cyclohexylbenzene, biphenyl, t-butylbenzene, vinylene carbonate, vinyl ethylene carbonate, difluoroanisole, fluoroethylene carbonate, propane sultone, succinonitrile, and dimethyl vinylene carbonate. Moreover, as used in a non-aqueous electrolyte battery referred to as a lithium polymer battery, an electrolytic solution for a non-aqueous electrolyte battery can be pseudo-solidified with a gelling agent or a cross-linked polymer and then used.

Next, the constitution of the non-aqueous electrolyte battery of the present invention will be explained. The non-aqueous electrolyte battery of the present invention is characterized by the use of the above electrolytic solution for a non-aqueous electrolyte battery of the present invention. Members that are generally used for a non-aqueous electrolyte battery are used as other constitutional members. Specifically, such a battery is composed of, for example, a positive electrode, a negative electrode capable of occluding and releasing cations, a collector, a separator, and a container.

Examples of an negative electrode material to be used herein are not particularly limited. However, in the case of a lithium battery and a lithium ion battery, they include a lithium metal, an alloy of a lithium metal and another metal, or intermetallic compounds, various carbon materials (e.g., artificial graphite and natural graphite), a metal oxide, a metal nitride, tin (elemental substance), a tin compound, silicon (elemental substance), a silicon compound, an activated carbon, and a conductive polymer.

Examples of carbon materials include easily graphitizable carbon, hardly graphitizable carbon (hard carbon) having the interplanar spacing of (002) plane of 0.37 nm or more, and graphite having the interplanar spacing of (002) plane of 0.34 nm or less. More specific examples thereof include pyrolytic carbon, cokes, glassy carbon fibers, organic polymer compound fired bodies, activated carbon or carbon blacks. Of these, cokes include a pitch coke, a needle coke or a petroleum coke. An organic polymer compound fired body is referred to as a product produced by burning a phenol resin, a furan resin or the like at an appropriate temperature, to carbonize it. Carbon materials are preferred since the crystal structure changes much less due to the occlusion and release of lithium, so that a high energy density and an excellent cycle characteristic can be obtained. In addition, the shape of a carbon material may be fibrous, spherical, granular or squamous. Furthermore, amorphous carbon or a graphite material whose surface is coated with amorphous carbon is more preferred since the reactivity between the material surface and the electrolytic solution decreases.

Examples of a positive electrode material to be used herein include, but are not particularly limited to, in the case of a lithium battery and a lithium ion battery, lithium-containing transition metal composite oxides such as $LiCoO_2$, $LiNiO_2$, $LiMnO_2$, and $LiMn_2O_4$, a mixture of a plurality of such lithium-containing transition metal composite oxides wherein plural kinds of transition metals, e.g., Co, Mn, and Ni, are contained, those wherein the transition metals of the lithium-containing transition metal composite oxides thereof are partially substituted with other transition metals, phosphate compounds of transition metals referred to as olivine such as $LiFePO_4$, $LiCoPO_4$ and $LiMnPO_4$, oxides such as $TiO_2$, $V_2O_5$ and $MoO_3$, sulfides such as $TiS_2$ and FeS, or conductive polymers such as polyacetylene, polyparaphenylene, polyaniline and polypyrrole, activated carbon, polymers that generate radicals, and carbon materials.

To a positive electrode or negative electrode material, acetylene black, Ketjen black, carbon fiber, or graphite as a conductive material and polytetrafluoroethylene, polyvinylidene fluoride, SBR resin or the like as a binder material are added, and then the resultant material is formed into a sheet, so that an electrode sheet can be produced.

As a separator for preventing the contact between a positive electrode and a negative electrode, a nonwoven fabric or porous sheet made of polypropylene, polyethylene, paper, and glass fiber is used.

A non-aqueous electrolyte battery in a coin shape, cylindrical shape, square shape, laminated aluminum sheet form, or the like is assembled with the above elements.

EXAMPLES

The present invention will be more specifically explained with reference to Examples, but the scope of the present invention is not limited by these Examples.

Example 1-1

A mixed solvent containing ethylene carbonate, propylene carbonate, dimethyl carbonate and ethyl methyl carbonate at a volume ratio of 2:1:3:4 was used as a non-aqueous solvent. $LiPF_6$ as a solute was dissolved in the solvent to a concentration of 1.0 mol/L, and the above compound No. 1 of dilithium salt was dissolved as a salt having a divalent imide anion to a concentration of 1.0 mass %. As shown in Table 1, electrolytic solutions for non-aqueous electrolyte batteries were prepared. In addition, the above preparation was performed while maintaining the liquid temperature at 25° C.

Cells were prepared using the electrolytic solution, $LiNi_{1/3}Mn_{1/3}Co_{1/3}O_2$ as a positive electrode material, and graphite as a negative electrode material. The cells were actually evaluated for a cycle characteristic and a low-temperature output characteristic of the batteries. A cell for a test was prepared as follows.

$LiNi_{1/3}Mn_{1/3}Co_{1/3}O_2$ powder (90 mass %) was mixed with 5 mass % of polyvinylidene fluoride (PVDF) as a binder and 5 mass % of acetylene black as a conductive material. N-methylpyrrolidone was further added to the mixture and then prepared into a paste. The paste was applied onto an aluminum foil, and dried, thereby preparing a positive electrode for a test. Graphite powder (90 mass %) was mixed with 10 mass % of PVDF as a binder and then N-methylpyrrolidone was further added to form a slurry. The slurry was applied onto a copper foil and dried at 150° C. for 12 hours, thereby obtaining a negative electrode for the test. A polyethylene separator was impregnated with the prepared electrolytic solution, so as to assemble a 50 mAh cell armored with an aluminum laminate.

A charge and discharge test was conducted using the cells prepared by the above methods in order to evaluate a high-temperature cycle characteristic and a low-temperature output characteristic. The evaluation results are shown in Table 4.

High-Temperature Cycle Characteristics Test

The charge and discharge were conducted at an ambient temperature of 45° C. to evaluate the cycle characteristic. The charging was performed to 4.3 V, and discharging was performed to 3.0 V, and then a charge and discharge cycle was repeated at current density of 5.7 $mA/cm^2$. The cells were evaluated for the degree of the deterioration based on discharge capacity maintenance % after 200 cycles (evaluation of cycle characteristics). Discharge capacity maintenance % was determined by the following formula.

<Discharge capacity maintenance % after 200 cycles>

Discharge capacity maintenance (%)=(discharge capacity after 200 cycles/initial discharge capacity)×100

Low-Temperature Output Characteristic Test

Under an ambient temperature of 25° C., a constant current and constant voltage method was conducted with an upper limit charging voltage of 4.3 V, wherein charging and discharging were performed with a current density of 0.38 $mA/cm^2$. The discharge capacity at this time was designated as discharge capacity A. Subsequently, under an ambient temperature of −30° C., a constant current and constant voltage method was conducted with an upper limit charging voltage of 4.3 V, wherein charging was performed with a current density of 0.38 mA/cm², and then discharging was performed with a constant current density of 9.5 mA/cm² to discharge end voltage of 3.0 V. The discharge capacity at this time was designated as discharge capacity B, a value determined by "(discharge capacity B/discharge capacity A)×100" was designated as high output capacity maintenance (%), and was used for evaluating the low-temperature output characteristic of the cells.

Examples 1-2 to 1-155, and Comparative Examples 1-1 to 1-17

As shown in Tables 1 to 3, the electrolytic solutions for non-aqueous electrolyte batteries were prepared and cells were produced in a manner similar to Example 1-1, except that the kinds and concentrations (mol/L) of solutes and the kinds and concentrations (mass %) of the salts having imide anions were varied, and then the batteries were evaluated. The evaluation results are shown in Tables 4 to 6. In this case, the evaluation results of Examples 1-1 to 1-155 and Comparative examples 1-1 to 1-17 are indicated as relative values when the value of Comparative example 1-1 is designated as 100.

In addition, the following compounds Nos. 19 to 24 were used as the salts having imide anions used in Comparative examples 1-2 to 1-7.

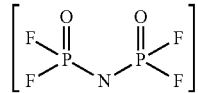

Compound No. 19

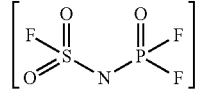

Compound No. 20

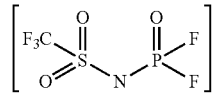

Compound No. 21

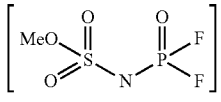

Compound No. 22

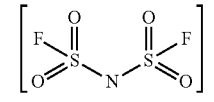

Compound No. 23

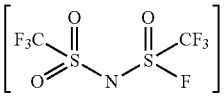

Compound No. 24

TABLE 1

| | Solute 1 | | Solute 2 | | Salt having imide anion | | |
|---|---|---|---|---|---|---|---|
| | Kind | Concentration [mol/L] | Kind | Concentration [mol/L] | Compound No. | Counter cation | Concentration [mass %] |
| Electrolytic solution No. 1 | LiPF$_6$ | 1.0 | None | 0 | No. 1 | 2Li$^+$ | 1.0 |
| Electrolytic solution No. 2 | | | | | | | 0.005 |
| Electrolytic solution No. 3 | | | | | | | 0.05 |
| Electrolytic solution No. 4 | | | | | | | 0.1 |
| Electrolytic solution No. 5 | | | | | | | 0.5 |
| Electrolytic solution No. 6 | | | | | | | 2.0 |
| Electrolytic solution No. 7 | | | | | | | 10.0 |
| Electrolytic solution No. 8 | | | | | | No. 2 | | 1.0 |
| Electrolytic solution No. 9 | | | | | | No. 3 | | 1.0 |
| Electrolytic solution No. 10 | | | | | | No. 4 | | 1.0 |
| Electrolytic solution No. 11 | | | | | | No. 5 | | 1.0 |
| Electrolytic solution No. 12 | | | | | | No. 6 | | 1.0 |

TABLE 1-continued

| | Solute 1 | | Solute 2 | | Salt having imide anion | | |
|---|---|---|---|---|---|---|---|
| | Kind | Concentration [mol/L] | Kind | Concentration [mol/L] | Compound No. | Counter cation | Concentration [mass %] |
| Electrolytic solution No. 13 | | | | | No. 7 | | 1.0 |
| Electrolytic solution No. 14 | | | | | No. 8 | | 1.0 |
| Electrolytic solution No. 15 | | | | | No. 9 | | 1.0 |
| Electrolytic solution No. 16 | | | | | No. 10 | | 1.0 |
| Electrolytic solution No. 17 | | | | | No. 11 | | 1.0 |
| Electrolytic solution No. 18 | | | | | No. 12 | | 1.0 |
| Electrolytic solution No. 19 | | | | | No. 13 | | 1.0 |
| Electrolytic solution No. 20 | | | | | No. 14 | | 1.0 |
| Electrolytic solution No. 21 | | | | | No. 15 | | 1.0 |
| Electrolytic solution No. 22 | | | | | No. 16 | | 1.0 |
| Electrolytic solution No. 23 | | | | | No. 17 | | 1.0 |
| Electrolytic solution No. 24 | | | | | No. 18 | | 1.0 |
| Electrolytic solution No. 25 | | | | | No. 1 | $Li^+$, $H^+$ | 1.0 |
| Electrolytic solution No. 26 | | | | | No. 6 | | 1.0 |
| Electrolytic solution No. 27 | | | | | No. 7 | | 1.0 |
| Electrolytic solution No. 28 | | | | | No. 10 | | 1.0 |
| Electrolytic solution No. 29 | | | | | No. 11 | | 1.0 |
| Electrolytic solution No. 30 | | | | | No. 15 | | 1.0 |
| Electrolytic solution No. 31 | | | | | No. 16 | | 1.0 |
| Electrolytic solution No. 32 | | | | | No. 1 | $Li^+$, $Na^+$ | 1.0 |
| Electrolytic solution No. 33 | | | | | No. 6 | | 1.0 |
| Electrolytic solution No. 34 | | | | | No. 7 | | 1.0 |
| Electrolytic solution No. 35 | | | | | No. 10 | | 1.0 |
| Electrolytic solution No. 36 | | | | | No. 11 | | 1.0 |
| Electrolytic solution No. 37 | | | | | No. 15 | | 1.0 |

TABLE 1-continued

|  | Solute 1 | | Solute 2 | | Salt having imide anion | | |
|---|---|---|---|---|---|---|---|
|  | Kind | Concentration [mol/L] | Kind | Concentration [mol/L] | Compound No. | Counter cation | Concentration [mass %] |
| Electrolytic solution No. 38 |  |  |  |  | No. 16 |  | 1.0 |
| Electrolytic solution No. 39 |  |  |  |  | No. 1 | $Li^+, K^+$ | 1.0 |
| Electrolytic solution No. 40 |  |  |  |  | No. 6 |  | 1.0 |
| Electrolytic solution No. 41 |  |  |  |  | No. 7 |  | 1.0 |
| Electrolytic solution No. 42 |  |  |  |  | No. 10 |  | 1.0 |
| Electrolytic solution No. 43 |  |  |  |  | No. 11 |  | 1.0 |
| Electrolytic solution No. 44 |  |  |  |  | No. 15 |  | 1.0 |
| Electrolytic solution No. 45 |  |  |  |  | No. 16 |  | 1.0 |
| Electrolytic solution No. 46 |  |  |  |  | No. 1 | $Li^+, (C_2H_5)_4N^+$ | 1.0 |
| Electrolytic solution No. 47 |  |  |  |  | No. 6 |  | 1.0 |
| Electrolytic solution No. 48 |  |  |  |  | No. 7 |  | 1.0 |
| Electrolytic solution No. 49 |  |  |  |  | No. 10 |  | 1.0 |
| Electrolytic solution No. 50 |  |  |  |  | No. 11 |  | 1.0 |
| Electrolytic solution No. 51 |  |  |  |  | No. 15 |  | 1.0 |
| Electrolytic solution No. 52 |  |  |  |  | No. 16 |  | 1.0 |
| Electrolytic solution No. 53 |  |  |  |  | No. 1 | $Li^+, (C_2H_5)_4P^+$ | 1.0 |
| Electrolytic solution No. 54 |  |  |  |  | No. 6 |  | 1.0 |
| Electrolytic solution No. 55 |  |  |  |  | No. 7 |  | 1.0 |
| Electrolytic solution No. 56 |  |  |  |  | No. 10 |  | 1.0 |
| Electrolytic solution No. 57 |  |  |  |  | No. 11 |  | 1.0 |
| Electrolytic solution No. 58 |  |  |  |  | No. 15 |  | 1.0 |
| Electrolytic solution No. 59 |  |  |  |  | No. 16 |  | 1.0 |

TABLE 2

| | Solute 1 | | Solute 2 | | Salt having imide anion | | |
|---|---|---|---|---|---|---|---|
| | Kind | Concentration [mol/L] | Kind | Concentration [mol/L] | Compound No. | Counter cation | Concentration [mass %] |
| Electrolytic solution No. 60 | $LiPF_6$ | 1.0 | None | 0 | No. 1 | $2Na^+$ | 1.0 |
| Electrolytic solution No. 61 | | | | | No. 6 | | 1.0 |
| Electrolytic solution No. 62 | | | | | No. 7 | | 1.0 |
| Electrolytic solution No. 63 | | | | | No. 10 | | 1.0 |
| Electrolytic solution No. 64 | | | | | No. 11 | | 1.0 |
| Electrolytic solution No. 65 | | | | | No. 15 | | 1.0 |
| Electrolytic solution No. 66 | | | | | No. 16 | | 1.0 |
| Electrolytic solution No. 67 | | | | | No. 1 | $2(C_2H_5)_4N^+$ | 1.0 |
| Electrolytic solution No. 68 | | | | | No. 6 | | 1.0 |
| Electrolytic solution No. 69 | | | | | No. 7 | | 1.0 |
| Electrolytic solution No. 70 | | | | | No. 10 | | 1.0 |
| Electrolytic solution No. 71 | | | | | No. 11 | | 1.0 |
| Electrolytic solution No. 72 | | | | | No. 15 | | 1.0 |
| Electrolytic solution No. 73 | | | | | No. 16 | | 1.0 |
| Electrolytic solution No. 74 | | | | | No. 1 | $2(C_2H_5)_4P^+$ | 1.0 |
| Electrolytic solution No. 75 | | | | | No. 6 | | 1.0 |
| Electrolytic solution No. 76 | | | | | No. 7 | | 1.0 |
| Electrolytic solution No. 77 | | | | | No. 10 | | 1.0 |
| Electrolytic solution No. 78 | | | | | No. 11 | | 1.0 |
| Electrolytic solution No. 79 | | | | | No. 15 | | 1.0 |
| Electrolytic solution No. 80 | | | | | No. 16 | | 1.0 |
| Electrolytic solution No. 81 | | | $LiPF_2(C_2O_4)_2$ | 0.001 | No. 1 | $2Li^+$ | 1.0 |
| Electrolytic solution No. 82 | | | | 0.01 | | | 1.0 |
| Electrolytic solution No. 83 | | | | 0.05 | | | 1.0 |
| Electrolytic solution No. 84 | | | | 0.1 | | | 1.0 |

TABLE 2-continued

| | Solute 1 | | Solute 2 | | Salt having imide anion | | |
|---|---|---|---|---|---|---|---|
| | Kind | Concentration [mol/L] | Kind | Concentration [mol/L] | Compound No. | Counter cation | Concentration [mass %] |
| Electrolytic solution No. 85 | | | | 0.2 | | | 1.0 |
| Electrolytic solution No. 86 | | | | 0.5 | | | 1.0 |
| Electrolytic solution No. 87 | | | | 0.1 | No. 6 | | 1.0 |
| Electrolytic solution No. 88 | | | | 0.1 | No. 7 | | 1.0 |
| Electrolytic solution No. 89 | | | | 0.1 | No. 10 | | 1.0 |
| Electrolytic solution No. 90 | | | | 0.1 | No. 11 | | 1.0 |
| Electrolytic solution No. 91 | | | | 0.1 | No. 15 | | 1.0 |
| Electrolytic solution No. 92 | | | | 0.1 | No. 16 | | 1.0 |
| Electrolytic solution No. 93 | | | $LiPF_4(C_2O_4)$ | 0.1 | No. 1 | | 1.0 |
| Electrolytic solution No. 94 | | | | 0.1 | No. 6 | | 1.0 |
| Electrolytic solution No. 95 | | | | 0.1 | No. 7 | | 1.0 |
| Electrolytic solution No. 96 | | | | 0.1 | No. 10 | | 1.0 |
| Electrolytic solution No. 97 | | | | 0.1 | No. 11 | | 1.0 |
| Electrolytic solution No. 98 | | | | 0.1 | No. 15 | | 1.0 |
| Electrolytic solution No. 99 | | | | 0.1 | No. 16 | | 1.0 |
| Electrolytic solution No. 100 | | | $LiP(C_2O_4)_3$ | 0.1 | No. 1 | | 1.0 |
| Electrolytic solution No. 101 | | | | 0.1 | No. 6 | | 1.0 |
| Electrolytic solution No. 102 | | | | 0.1 | No. 7 | | 1.0 |
| Electrolytic solution No. 103 | | | | 0.1 | No. 10 | | 1.0 |
| Electrolytic solution No. 104 | | | | 0.1 | No. 11 | | 1.0 |
| Electrolytic solution No. 105 | | | | 0.1 | No. 15 | | 1.0 |
| Electrolytic solution No. 106 | | | | 0.1 | No. 16 | | 1.0 |
| Electrolytic solution No. 107 | | | $LiBF_2(C_2O_4)$ | 0.1 | No. 1 | | 1.0 |
| Electrolytic solution No. 108 | | | | 0.1 | No. 6 | | 1.0 |
| Electrolytic solution No. 109 | | | | 0.1 | No. 7 | | 1.0 |

TABLE 2-continued

| | Solute 1 | | Solute 2 | | Salt having imide anion | | |
|---|---|---|---|---|---|---|---|
| | Kind | Concentration [mol/L] | Kind | Concentration [mol/L] | Compound No. | Counter cation | Concentration [mass %] |
| Electrolytic solution No. 110 | | | | 0.1 | No. 10 | | 1.0 |
| Electrolytic solution No. 111 | | | | 0.1 | No. 11 | | 1.0 |
| Electrolytic solution No. 112 | | | | 0.1 | No. 15 | | 1.0 |
| Electrolytic solution No. 113 | | | | 0.1 | No. 16 | | 1.0 |
| Electrolytic solution No. 114 | | | LiB(C$_2$O$_4$)$_2$ | 0.1 | No. 1 | | 1.0 |
| Electrolytic solution No. 115 | | | | 0.1 | No. 6 | | 1.0 |
| Electrolytic solution No. 116 | | | | 0.1 | No. 7 | | 1.0 |
| Electrolytic solution No. 117 | | | | 0.1 | No. 10 | | 1.0 |
| Electrolytic solution No. 118 | | | | 0.1 | No. 11 | | 1.0 |
| Electrolytic solution No. 119 | | | | 0.1 | No. 15 | | 1.0 |
| Electrolytic solution No. 120 | | | | 0.1 | No. 16 | | 1.0 |

TABLE 3

| | Solute 1 | | Solute 2 | | Salt having imide anion | | |
|---|---|---|---|---|---|---|---|
| | Kind | Concentration [mol/L] | Kind | Concentration [mol/L] | Compound No. | Counter cation | Concentration [mass %] |
| Electrolytic solution No. 121 | LiPF$_6$ | 1.0 | LiPO$_2$F$_2$ | 0.1 | No. 1 | 2Li$^+$ | 1.0 |
| Electrolytic solution No. 122 | | | | 0.1 | No. 6 | | 1.0 |
| Electrolytic solution No. 123 | | | | 0.1 | No. 7 | | 1.0 |
| Electrolytic solution No. 124 | | | | 0.1 | No. 10 | | 1.0 |
| Electrolytic solution No. 125 | | | | 0.1 | No. 11 | | 1.0 |
| Electrolytic solution No. 126 | | | | 0.1 | No. 15 | | 1.0 |
| Electrolytic solution No. 127 | | | | 0.1 | No. 16 | | 1.0 |
| Electrolytic solution No. 128 | | | LiN(F$_2$PO)$_2$ | 0.1 | No. 1 | | 1.0 |
| Electrolytic solution No. 129 | | | | 0.1 | No. 6 | | 1.0 |
| Electrolytic solution No. 130 | | | | 0.1 | No. 7 | | 1.0 |

TABLE 3-continued

| | Solute 1 | | Solute 2 | | Salt having imide anion | | |
|---|---|---|---|---|---|---|---|
| | Kind | Concentration [mol/L] | Kind | Concentration [mol/L] | Compound No. | Counter cation | Concentration [mass %] |
| Electrolytic solution No. 131 | | | | 0.1 | No. 10 | | 1.0 |
| Electrolytic solution No. 132 | | | | 0.1 | No. 11 | | 1.0 |
| Electrolytic solution No. 133 | | | | 0.1 | No. 15 | | 1.0 |
| Electrolytic solution No. 134 | | | | 0.1 | No. 16 | | 1.0 |
| Electrolytic solution No. 135 | | | $LiN(FSO_2)_2$ | 0.1 | No. 1 | | 1.0 |
| Electrolytic solution No. 136 | | | | 0.1 | No. 6 | | 1.0 |
| Electrolytic solution No. 137 | | | | 0.1 | No. 7 | | 1.0 |
| Electrolytic solution No. 138 | | | | 0.1 | No. 10 | | 1.0 |
| Electrolytic solution No. 139 | | | | 0.1 | No. 11 | | 1.0 |
| Electrolytic solution No. 140 | | | | 0.1 | No. 15 | | 1.0 |
| Electrolytic solution No. 141 | | | | 0.1 | No. 16 | | 1.0 |
| Electrolytic solution No. 142 | | | $LiN(CF_3SO_2)_2$ | 0.1 | No. 1 | | 1.0 |
| Electrolytic solution No. 143 | | | | 0.1 | No. 6 | | 1.0 |
| Electrolytic solution No. 144 | | | | 0.1 | No. 7 | | 1.0 |
| Electrolytic solution No. 145 | | | | 0.1 | No. 10 | | 1.0 |
| Electrolytic solution No. 146 | | | | 0.1 | No. 11 | | 1.0 |
| Electrolytic solution No. 147 | | | | 0.1 | No. 15 | | 1.0 |
| Electrolytic solution No. 148 | | | | 0.1 | No. 16 | | 1.0 |
| Electrolytic solution No. 149 | | | $LiBF_4$ | 0.1 | No. 1 | | 1.0 |
| Electrolytic solution No. 150 | | | | 0.1 | No. 6 | | 1.0 |
| Electrolytic solution No. 151 | | | | 0.1 | No. 7 | | 1.0 |
| Electrolytic solution No. 152 | | | | 0.1 | No. 10 | | 1.0 |
| Electrolytic solution No. 153 | | | | 0.1 | No. 11 | | 1.0 |
| Electrolytic solution No. 154 | | | | 0.1 | No. 15 | | 1.0 |
| Electrolytic solution No. 155 | | | | 0.1 | No. 16 | | 1.0 |

TABLE 3-continued

|  | Solute 1 | | Solute 2 | | Salt having imide anion | | |
|---|---|---|---|---|---|---|---|
|  | Kind | Concentration [mol/L] | Kind | Concentration [mol/L] | Compound No. | Counter cation | Concentration [mass %] |
| Electrolytic solution No. 156 |  |  | None | 0 | None | — | 0 |
| Electrolytic solution No. 157 |  |  |  |  | No. 19 | Li$^+$ | 1.0 |
| Electrolytic solution No. 158 |  |  |  |  | No. 20 |  | 1.0 |
| Electrolytic solution No. 159 |  |  |  |  | No. 21 |  | 1.0 |
| Electrolytic solution No. 160 |  |  |  |  | No. 22 |  | 1.0 |
| Electrolytic solution No. 161 |  |  |  |  | No. 23 |  | 1.0 |
| Electrolytic solution No. 162 |  |  |  |  | No. 24 |  | 1.0 |
| Electrolytic solution No. 163 |  |  | LiPF$_2$(C$_2$O$_4$)$_2$ | 0.1 | None | — | 0 |
| Electrolytic solution No. 164 |  |  | LiPF$_4$(C$_2$O$_4$) | 0.1 |  |  | 0 |
| Electrolytic solution No. 165 |  |  | LiP(C$_2$O$_4$)$_3$ | 0.1 |  |  | 0 |
| Electrolytic solution No. 166 |  |  | LiBF$_2$(C$_2$O$_4$) | 0.1 |  |  | 0 |
| Electrolytic solution No. 167 |  |  | LiB(C$_2$O$_4$)$_2$ | 0.1 |  |  | 0 |
| Electrolytic solution No. 168 |  |  | LiPO$_2$F$_2$ | 0.1 |  |  | 0 |
| Electrolytic solution No. 169 |  |  | LiN(F$_2$PO)$_2$ | 0.1 |  |  | 0 |
| Electrolytic solution No. 170 |  |  | LiN(FSO$_2$)$_2$ | 0.1 |  |  | 0 |
| Electrolytic solution No. 171 |  |  | LiN(CF$_3$SO$_2$)$_2$ | 0.1 |  |  | 0 |
| Electrolytic solution No. 172 |  |  | LiBF$_4$ | 0.1 |  |  | 0 |

TABLE 4

|  | Electrolytic solution No. | Positive electrode Active material | Negative electrode Active material | Discharge capacity maintenance after 200 cycles* [%] | High power capacity maintenance* [%] |
|---|---|---|---|---|---|
| Example 1-1 | No. 1 | LiNi$_{1/3}$Mn$_{1/3}$Co$_{1/3}$O$_2$ | Graphite | 120 | 127 |
| Example 1-2 | No. 2 |  |  | 103 | 104 |
| Example 1-3 | No. 3 |  |  | 110 | 110 |
| Example 1-4 | No. 4 |  |  | 114 | 115 |
| Example 1-5 | No. 5 |  |  | 117 | 122 |

TABLE 4-continued

|  | Electrolytic solution No. | Positive electrode Active material | Negative electrode Active material | Discharge capacity maintenance after 200 cycles* [%] | High power capacity maintenance* [%] |
|---|---|---|---|---|---|
| Example 1-6 | No. 6 | | | 113 | 115 |
| Example 1-7 | No. 7 | | | 107 | 105 |
| Example 1-8 | No. 8 | | | 116 | 118 |
| Example 1-9 | No. 9 | | | 117 | 117 |
| Example 1-10 | No. 10 | | | 118 | 115 |
| Example 1-11 | No. 11 | | | 115 | 117 |
| Example 1-12 | No. 12 | | | 118 | 125 |
| Example 1-13 | No. 13 | | | 113 | 111 |
| Example 1-14 | No. 14 | | | 114 | 113 |
| Example 1-15 | No. 15 | | | 118 | 114 |
| Example 1-16 | No. 16 | | | 117 | 116 |
| Example 1-17 | No. 17 | | | 115 | 123 |
| Example 1-18 | No. 18 | | | 108 | 108 |
| Example 1-19 | No. 19 | | | 109 | 107 |
| Example 1-20 | No. 20 | | | 112 | 107 |
| Example 1-21 | No. 21 | | | 117 | 124 |
| Example 1-22 | No. 22 | | | 118 | 120 |
| Example 1-23 | No. 23 | | | 116 | 122 |
| Example 1-24 | No. 24 | | | 115 | 121 |
| Example 1-25 | No. 25 | | | 119 | 126 |
| Example 1-26 | No. 26 | | | 118 | 124 |
| Example 1-27 | No. 27 | | | 112 | 111 |
| Example 1-28 | No. 28 | | | 116 | 115 |
| Example 1-29 | No. 29 | | | 115 | 122 |
| Example 1-30 | No. 30 | | | 117 | 122 |
| Example 1-31 | No. 31 | | | 117 | 120 |
| Example 1-32 | No. 32 | | | 119 | 125 |
| Example 1-33 | No. 33 | | | 117 | 123 |
| Example 1-34 | No. 34 | | | 111 | 110 |
| Example 1-35 | No. 35 | | | 116 | 114 |
| Example 1-36 | No. 36 | | | 113 | 121 |
| Example 1-37 | No. 37 | | | 115 | 123 |
| Example 1-38 | No. 38 | | | 117 | 118 |
| Example 1-39 | No. 39 | | | 115 | 120 |
| Example 1-40 | No. 40 | | | 113 | 118 |
| Example 1-41 | No. 41 | | | 108 | 107 |

TABLE 4-continued

| | Electrolytic solution No. | Positive electrode Active material | Negative electrode Active material | Discharge capacity maintenance after 200 cycles* [%] | High power capacity maintenance* [%] |
|---|---|---|---|---|---|
| Example 1-42 | No. 42 | | | 113 | 109 |
| Example 1-43 | No. 43 | | | 111 | 116 |
| Example 1-44 | No. 44 | | | 112 | 118 |
| Example 1-45 | No. 45 | | | 113 | 114 |
| Example 1-46 | No. 46 | | | 114 | 121 |
| Example 1-47 | No. 47 | | | 113 | 120 |
| Example 1-48 | No. 48 | | | 108 | 108 |
| Example 1-49 | No. 49 | | | 112 | 113 |
| Example 1-50 | No. 50 | | | 110 | 115 |
| Example 1-51 | No. 51 | | | 113 | 115 |
| Example 1-52 | No. 52 | | | 113 | 114 |
| Example 1-53 | No. 53 | | | 119 | 124 |
| Example 1-54 | No. 54 | | | 116 | 123 |
| Example 1-55 | No. 55 | | | 111 | 110 |
| Example 1-56 | No. 56 | | | 115 | 114 |
| Example 1-57 | No. 57 | | | 114 | 121 |
| Example 1-58 | No. 58 | | | 115 | 121 |
| Example 1-59 | No. 59 | | | 115 | 119 |

*Relative value when the value of Comparative example 1-1 is designated as 100.

TABLE 5

| | Electrolytic solution No. | Positive electrode Active material | Negative electrode Active material | Discharge capacity maintenance after 200 cycles* [%] | High power capacity maintenance* [%] |
|---|---|---|---|---|---|
| Example 1-60 | No. 60 | $LiNi_{1/3}Mn_{1/3}Co_{1/3}O_2$ | Graphite | 117 | 123 |
| Example 1-61 | No. 61 | | | 115 | 121 |
| Example 1-62 | No. 62 | | | 110 | 109 |
| Example 1-63 | No. 63 | | | 115 | 113 |
| Example 1-64 | No. 64 | | | 112 | 120 |
| Example 1-65 | No. 65 | | | 114 | 117 |
| Example 1-66 | No. 66 | | | 115 | 115 |
| Example 1-67 | No. 67 | | | 111 | 116 |
| Example 1-68 | No. 68 | | | 109 | 114 |
| Example 1-69 | No. 69 | | | 107 | 107 |
| Example 1-70 | No. 70 | | | 109 | 109 |

TABLE 5-continued

| | Electrolytic solution No. | Positive electrode Active material | Negative electrode Active material | Discharge capacity maintenance after 200 cycles* [%] | High power capacity maintenance* [%] |
|---|---|---|---|---|---|
| Example 1-71 | No. 71 | | | 109 | 115 |
| Example 1-72 | No. 72 | | | 110 | 115 |
| Example 1-73 | No. 73 | | | 111 | 113 |
| Example 1-74 | No. 74 | | | 110 | 114 |
| Example 1-75 | No. 75 | | | 108 | 112 |
| Example 1-76 | No. 76 | | | 107 | 106 |
| Example 1-77 | No. 77 | | | 109 | 107 |
| Example 1-78 | No. 78 | | | 108 | 112 |
| Example 1-79 | No. 79 | | | 109 | 113 |
| Example 1-80 | No. 80 | | | 110 | 111 |
| Example 1-81 | No. 81 | | | 121 | 128 |
| Example 1-82 | No. 82 | | | 125 | 130 |
| Example 1-83 | No. 83 | | | 129 | 133 |
| Example 1-84 | No. 84 | | | 133 | 136 |
| Example 1-85 | No. 85 | | | 134 | 136 |
| Example 1-86 | No. 86 | | | 130 | 132 |
| Example 1-87 | No. 87 | | | 130 | 132 |
| Example 1-88 | No. 88 | | | 124 | 115 |
| Example 1-89 | No. 89 | | | 128 | 122 |
| Example 1-90 | No. 90 | | | 126 | 130 |
| Example 1-91 | No. 91 | | | 128 | 137 |
| Example 1-92 | No. 92 | | | 129 | 131 |
| Example 1-93 | No. 93 | | | 129 | 132 |
| Example 1-94 | No. 94 | | | 128 | 130 |
| Example 1-95 | No. 95 | | | 122 | 115 |
| Example 1-96 | No. 96 | | | 127 | 120 |
| Example 1-97 | No. 97 | | | 125 | 128 |
| Example 1-98 | No. 98 | | | 126 | 129 |
| Example 1-99 | No. 99 | | | 128 | 125 |
| Example 1-100 | No. 100 | | | 132 | 130 |
| Example 1-101 | No. 101 | | | 130 | 127 |
| Example 1-102 | No. 102 | | | 125 | 113 |
| Example 1-103 | No. 103 | | | 128 | 118 |
| Example 1-104 | No. 104 | | | 127 | 125 |
| Example 1-105 | No. 105 | | | 129 | 126 |
| Example 1-106 | No. 106 | | | 129 | 123 |

TABLE 5-continued

|  | Electrolytic solution No. | Positive electrode Active material | Negative electrode Active material | Discharge capacity maintenance after 200 cycles* [%] | High power capacity maintenance* [%] |
|---|---|---|---|---|---|
| Example 1-107 | No. 107 | | | 128 | 133 |
| Example 1-108 | No. 108 | | | 127 | 130 |
| Example 1-109 | No. 109 | | | 121 | 117 |
| Example 1-110 | No. 110 | | | 125 | 122 |
| Example 1-111 | No. 111 | | | 124 | 128 |
| Example 1-112 | No. 112 | | | 126 | 130 |
| Example 1-113 | No. 113 | | | 127 | 126 |
| Example 1-114 | No. 114 | | | 127 | 128 |
| Example 1-115 | No. 115 | | | 125 | 125 |
| Example 1-116 | No. 116 | | | 120 | 111 |
| Example 1-117 | No. 117 | | | 126 | 116 |
| Example 1-118 | No. 118 | | | 123 | 124 |
| Example 1-119 | No. 119 | | | 124 | 124 |
| Example 1-120 | No. 120 | | | 125 | 121 |

*Relative value when the value of Comparative example 1-1 is designated as 100.

TABLE 6

|  | Electrolytic solution No. | Positive electrode Active material | Negative electrode Active material | Discharge capacity maintenance after 200 cycles* [%] | High power capacity maintenance* [%] |
|---|---|---|---|---|---|
| Example 1-121 | No. 121 | $LiNi_{1/3}Mn_{1/3}Co_{1/3}O_2$ | Graphite | 125 | 132 |
| Example 1-122 | No. 122 | | | 123 | 130 |
| Example 1-123 | No. 123 | | | 117 | 116 |
| Example 1-124 | No. 124 | | | 122 | 120 |
| Example 1-125 | No. 125 | | | 120 | 128 |
| Example 1-126 | No. 126 | | | 121 | 128 |
| Example 1-127 | No. 127 | | | 122 | 125 |
| Example 1-128 | No. 128 | | | 121 | 130 |
| Example 1-129 | No. 129 | | | 120 | 128 |
| Example 1-130 | No. 130 | | | 115 | 113 |
| Example 1-131 | No. 131 | | | 119 | 119 |
| Example 1-132 | No. 132 | | | 117 | 125 |
| Example 1-133 | No. 133 | | | 119 | 127 |
| Example 1-134 | No. 134 | | | 120 | 123 |
| Example 1-135 | No. 135 | | | 122 | 128 |

TABLE 6-continued

| | Electrolytic solution No. | Positive electrode Active material | Negative electrode Active material | Discharge capacity maintenance after 200 cycles* [%] | High power capacity maintenance* [%] |
|---|---|---|---|---|---|
| Example 1-136 | No. 136 | | | 120 | 126 |
| Example 1-137 | No. 137 | | | 115 | 112 |
| Example 1-138 | No. 138 | | | 118 | 118 |
| Example 1-139 | No. 139 | | | 117 | 125 |
| Example 1-140 | No. 140 | | | 119 | 125 |
| Example 1-141 | No. 141 | | | 120 | 121 |
| Example 1-142 | No. 142 | | | 121 | 127 |
| Example 1-143 | No. 143 | | | 119 | 125 |
| Example 1-144 | No. 144 | | | 114 | 111 |
| Example 1-145 | No. 145 | | | 119 | 117 |
| Example 1-146 | No. 146 | | | 116 | 123 |
| Example 1-147 | No. 147 | | | 118 | 124 |
| Example 1-148 | No. 148 | | | 119 | 120 |
| Example 1-149 | No. 149 | | | 120 | 127 |
| Example 1-150 | No. 150 | | | 119 | 125 |
| Example 1-151 | No. 151 | | | 113 | 111 |
| Example 1-152 | No. 152 | | | 117 | 117 |
| Example 1-153 | No. 153 | | | 115 | 123 |
| Example 1-154 | No. 154 | | | 117 | 124 |
| Example 1-155 | No. 155 | | | 119 | 120 |
| Comparative example 1-1 | No. 156 | | | 100 | 100 |
| Comparative example 1-2 | No. 157 | | | 104 | 104 |
| Comparative example 1-3 | No. 158 | | | 103 | 104 |
| Comparative example 1-4 | No. 159 | | | 103 | 103 |
| Comparative example 1-5 | No. 160 | | | 102 | 103 |
| Comparative example 1-6 | No. 161 | | | 102 | 101 |
| Comparative example 1-7 | No. 162 | | | 110 | 100 |
| Comparative example 1-8 | No. 163 | | | 112 | 108 |
| Comparative example 1-9 | No. 164 | | | 110 | 105 |
| Comparative example 1-10 | No. 165 | | | 112 | 102 |
| Comparative example 1-11 | No. 166 | | | 109 | 106 |

TABLE 6-continued

| | Electrolytic solution No. | Positive electrode Active material | Negative electrode Active material | Discharge capacity maintenance after 200 cycles* [%] | High power capacity maintenance* [%] |
|---|---|---|---|---|---|
| Comparative example 1-12 | No. 167 | | | 107 | 101 |
| Comparative example 1-13 | No. 168 | | | 105 | 105 |
| Comparative example 1-14 | No. 169 | | | 102 | 103 |
| Comparative example 1-15 | No. 170 | | | 102 | 101 |
| Comparative example 1-16 | No. 171 | | | 101 | 100 |
| Comparative example 1-17 | No. 172 | | | 100 | 100 |

*Relative value when the value of Comparative example 1-1 is designated as 100.

As a result of comparison of the above results, it was confirmed that both a high-temperature cycle characteristic and a low-temperature output characteristic were improved in Examples 1-1 to 1-24 in which the salts having divalent imide anions were added, as compared with Comparative example 1-1 in which no such salt was added. Similarly, it was confirmed that a high-temperature cycle characteristic and a low-temperature output characteristic were improved in Examples 1-1 and 1-8 to 1-24 in which the salts having divalent imide anions of the present invention were contained at the same concentration (1.0 mass %), as compared with Comparative examples 1-2 to 1-7 in which salts having monovalent imide anions were used.

Further, for example, among Examples 1-1 and 1-8 to 1-24 in which the compositional ratios of the electrolytic solutions were the same, it was confirmed that the Examples (Examples 1-1, 1-8 to 1-17 and 1-21 to 1-24) in which the salts having imide anions having P—F bonds or S—F bonds provided a low-temperature output characteristic which is better than that in the Examples (Examples 1-18 to 1-20) in which the salts having imide anions with no P—F bond and no S—F bond were used. Furthermore, it was confirmed that the higher the number of P—F bonds or S—F bonds in the above salts having imide anions, the more the low-temperature characteristic was improved.

Further, for example, among Examples 1-1 and 1-8 to 1-11 in which the salt having the divalent imide anion represented by the general formula (1) was used, a better high-temperature cycle characteristic was provided in Examples 1-1 and 1-8 to 1-10 in which $R^1$ to $R^3$ were a fluorine atom or an organic group selected from the group consisting of an alkenyloxy group and an alkynyloxy group, than that in Example 1-11 in which $R^1$ to $R^3$ are not the above groups.

Further, for example, among Examples 1-12 to 1-16 in which the salt having the divalent imide anion represented by the general formula (2) was used, a better high-temperature cycle characteristic was provided in Examples 1-12 and 1-14 to 1-16 in which X was a fluorine atom or an organic group selected from the group consisting of an alkoxy group, an alkenyloxy group, and an alkynyloxy group, than that in Example 1-13 in which X is not the above group.

Further, for example, among Examples 1-21 to 1-24 in which the salt having the divalent imide anion represented by the general formula (3) was used, it was confirmed that a better high-temperature cycle characteristic was provided in Examples 1-21 and 22 wherein $R^1$ and $R^2$ were a fluorine atom or an alkynyloxy group, than that in Examples 1-23 and 24 wherein $R^1$ and $R^2$ are not such groups.

Further, for example, among Examples 1-17 to 1-20 in which the salt having the divalent imide anion represented by the general formula (4) was used, it was confirmed that a better high-temperature cycle characteristic was provided in Examples 1-17, 1-19 and 1-20 in which X was a fluorine atom or an organic group selected from the group consisting of an alkoxy group and an alkynyloxy group, than that in Example 1-18 in which X is not such group.

It was confirmed in Examples 1-25 to 1-80 that the similar effects were also obtained, specifically, in systems where the counter cations of the divalent imide anions were varied.

Furthermore, even when $LiPF_6$ was mixed with another solute, it was confirmed that a high-temperature cycle characteristic and a low-temperature output characteristic were improved in Examples 1-81 to 1-155 in which the salts having divalent imide anions were added, as compared with Comparative examples 1-8 to 1-17 in which no salt having a divalent imide anion was added, and the similar effects were obtained.

Examples 2-1 to 2-21 and Comparative Examples 2-1 to 2-12

As shown in Table 7, the electrolytic solutions for non-aqueous electrolyte batteries were prepared, cells were produced, and then the batteries were evaluated in a manner similar to Example 1-1 except that the kinds of the negative electrodes and of the electrolytic solutions were varied.

In this case, a negative electrode using $Li_4Ti_5O_{12}$ as the active material was prepared by mixing 90 mass % of $Li_4Ti_5O_{12}$ powder with 5 mass % of PVDF as a binder and 5 mass % of acetylene black as a conductive agent, further adding N-methylpyrrolidone thereto, applying the thus obtained paste onto a copper foil, and then drying the resultant. When the resultant batteries were evaluated, the end-of-charge voltage was 2.8 V and the end-of-discharge voltage was 1.5 V.

Furthermore, a negative electrode using graphite (containing silicon) as the active material was prepared by mixing 81 mass % of graphite powder and 9 mass % of silicon powder with 5 mass % of PVDF as a binder and 5 mass % of acetylene black as a conductive material, further adding N-methylpyrrolidone thereto, applying the thus obtained paste onto a copper foil, and then drying the resultant. When the resultant batteries were evaluated, the end-of-charge voltage and the end-of-discharge voltage were the same as those in Example 1-1.

Moreover, a negative electrode using hard carbon as the active material was prepared by mixing 90 mass % of hard carbon powder with 5 mass % of PVDF as a binder and 5 mass % of acetylene black as a conductive agent, further adding N-methylpyrrolidone thereto, applying the thus obtained paste onto a copper foil, and then drying the resultant material. When the resultant batteries were evaluated, the end-of-charge voltage was 4.2 V and the end-of-discharge voltage was 2.2 V.

The evaluation results are shown in Table 7. In this case, the evaluation results of Examples 2-1 to 2-7 and Comparative examples 2-1 to 2-4 are indicated as relative values when the value of Comparative example 2-1 is designated as 100. Moreover, the evaluation results of Examples 2-8 to 2-14 and Comparative examples 2-5 to 2-8 are indicated as relative values when the value of Comparative example 2-5 is designated as 100. Moreover, the evaluation results of Examples 2-15 to 2-21 and Comparative examples 2-9 to 2-12 are indicated as relative values when the value of Comparative example 2-9 is designated as 100.

TABLE 7

| | Electrolytic solution No. | Positive electrode Active material | Negative electrode Active material | Discharge capacity maintenance after 200 cycles* [%] | High power capacity maintenance* [%] |
|---|---|---|---|---|---|
| Example 2-1 | No. 1 | $LiNi_{1/3}Mn_{1/3}Co_{1/3}O_2$ | $Li_4Ti_5O_{12}$ | 110 | 114 |
| Example 2-2 | No. 12 | | | 109 | 112 |
| Example 2-3 | No. 13 | | | 106 | 105 |
| Example 2-4 | No. 16 | | | 108 | 108 |
| Example 2-5 | No. 17 | | | 107 | 112 |
| Example 2-6 | No. 21 | | | 108 | 112 |
| Example 2-7 | No. 22 | | | 109 | 110 |
| Comparative example 2-1 | No. 156 | | | 100 | 100 |
| Comparative example 2-2 | No. 157 | | | 101 | 101 |
| Comparative example 2-3 | No. 161 | | | 101 | 100 |
| Comparative example 2-4 | No. 162 | | | 100 | 100 |
| Example 2-8 | No. 1 | | Graphite (containing silicon) | 117 | 122 |
| Example 2-9 | No. 12 | | | 115 | 120 |
| Example 2-10 | No. 13 | | | 110 | 107 |
| Example 2-11 | No. 16 | | | 115 | 112 |
| Example 2-12 | No. 17 | | | 113 | 120 |
| Example 2-13 | No. 21 | | | 114 | 120 |
| Example 2-14 | No. 22 | | | 115 | 116 |
| Comparative example 2-5 | No. 156 | | | 100 | 100 |

TABLE 7-continued

| | Electrolytic solution No. | Positive electrode Active material | Negative electrode Active material | Discharge capacity maintenance after 200 cycles* [%] | High power capacity maintenance* [%] |
|---|---|---|---|---|---|
| Comparative example 2-6 | No. 157 | | | 101 | 101 |
| Comparative example 2-7 | No. 161 | | | 101 | 101 |
| Comparative example 2-8 | No. 162 | | | 100 | 100 |
| Example 2-15 | No. 1 | | Hard carbon | 112 | 118 |
| Example 2-16 | No. 12 | | | 111 | 116 |
| Example 2-17 | No. 13 | | | 107 | 108 |
| Example 2-18 | No. 16 | | | 110 | 113 |
| Example 2-19 | No. 17 | | | 110 | 116 |
| Example 2-20 | No. 21 | | | 111 | 116 |
| Example 2-21 | No. 22 | | | 111 | 114 |
| Comparative example 2-9 | No. 156 | | | 100 | 100 |
| Comparative example 2-10 | No. 157 | | | 102 | 101 |
| Comparative example 2-11 | No. 161 | | | 101 | 101 |
| Comparative example 2-12 | No. 162 | | | 101 | 100 |

*Relative value in each corresponding battery constitution, when the value of Comparative example in which Electrolytic solution No. 156 was used is designated as 100.

Examples 3-1 to 3-28, and Comparative Examples 3-1 to 3-16

As shown in Table 8, the electrolytic solutions for non-aqueous electrolyte batteries were prepared, the cells were produced, and the batteries were evaluated in a manner similar to Example 1-1 except that the kinds of the positive electrodes, negative electrodes and electrolytic solutions were varied.

In this case, the positive electrode using $LiCoO_2$ as the active material was prepared by mixing 90 mass % of $LiCoO_2$ powder with 5 mass % of PVDF as a binder and 5 mass % of acetylene black as a conductive material, further adding N-methylpyrrolidone thereto, applying the thus obtained paste onto an aluminum foil, and then drying the resultant material.

In Examples 3-1 to 3-7 and Comparative examples 3-1 to 3-4, in which the active material of the negative electrode was graphite similarly to Example 1-1, when the resultant batteries were evaluated, the end-of-charge voltage was 4.2 V and the end-of-discharge voltage was 3.0 V.

In Examples 3-8 to 3-14 and Comparative examples 3-5 to 3-8, in which the active material of the negative electrode was $Li_4Ti_5O_{12}$ similarly to Example 2-1, when the resultant batteries were evaluated, the end-of-charge voltage was 2.7 V and the end-of-discharge voltage was 1.5 V.

In Examples 3-15 to 3-21 and Comparative examples 3-9 to 3-12, in which the active material of the negative electrode was graphite (containing silicon) similarly to Example 2-8, when the resultant batteries were evaluated, the end-of-charge voltage was 4.2V and the end-of-discharge voltage was 3.0 V.

In Examples 3-22 to 3-28 and Comparative examples 3-13 to 3-16, in which the active material of the negative electrode was hard carbon similarly to Example 2-15, when the resultant batteries were evaluated, the end-of-charge voltage was 4.1V and the end-of-discharge voltage was 2.2 V.

Evaluation results are shown in Table 8. In this case, the evaluation results of Examples 3-1 to 3-7 and Comparative examples 3-1 to 3-4 are indicated as relative values when the value of Comparative example 3-1 is designated as 100. Furthermore, the evaluation results of Examples 3-8 to 3-14 and Comparative examples 3-5 to 3-8 are indicated as relative values when the value of Comparative example 3-5 is designated as 100. Furthermore, the evaluation results of Examples 3-15 to 3-21 and Comparative examples 3-9 to 3-12 are indicated as relative values when the value of Comparative example 3-9 is designated as 100. Furthermore, the evaluation results of Examples 3-22 to 3-28 and Comparative examples 3-13 to 3-16 are indicated as relative values when the value of Comparative example 3-13 is designated as 100.

TABLE 8

| | Electrolytic solution No. | Positive electrode Active material | Negative electrode Active material | Discharge capacity maintenance after 200 cycles* [%] | High power capacity maintenance* [%] |
|---|---|---|---|---|---|
| Example 3-1 | No. 1 | $LiCoO_2$ | Graphite | 119 | 125 |
| Example 3-2 | No. 12 | | | 117 | 123 |
| Example 3-3 | No. 13 | | | 113 | 110 |
| Example 3-4 | No. 16 | | | 116 | 115 |
| Example 3-5 | No. 17 | | | 115 | 121 |
| Example 3-6 | No. 21 | | | 117 | 123 |
| Example 3-7 | No. 22 | | | 117 | 119 |
| Comparative example 3-1 | No. 156 | | | 100 | 100 |
| Comparative example 3-2 | No. 157 | | | 102 | 103 |
| Comparative example 3-3 | No. 161 | | | 102 | 102 |
| Comparative example 3-4 | No. 162 | | | 100 | 100 |
| Example 3-8 | No. 1 | | $Li_4Ti_5O_{12}$ | 110 | 113 |
| Example 3-9 | No. 12 | | | 108 | 111 |
| Example 3-10 | No. 13 | | | 106 | 105 |
| Example 3-11 | No. 16 | | | 108 | 107 |
| Example 3-12 | No. 17 | | | 107 | 110 |
| Example 3-13 | No. 21 | | | 108 | 111 |
| Example 3-14 | No. 22 | | | 108 | 110 |
| Comparative example 3-5 | No. 156 | | | 100 | 100 |
| Comparative example 3-6 | No. 157 | | | 101 | 101 |
| Comparative example 3-7 | No. 161 | | | 100 | 101 |
| Comparative example 3-8 | No. 162 | | | 100 | 100 |
| Example 3-15 | No. 1 | | Graphite (containing silicon) | 114 | 118 |
| Example 3-16 | No. 12 | | | 113 | 116 |
| Example 3-17 | No. 13 | | | 108 | 107 |
| Example 3-18 | No. 16 | | | 111 | 109 |
| Example 3-19 | No. 17 | | | 111 | 115 |
| Example 3-20 | No. 21 | | | 112 | 116 |
| Example 3-21 | No. 22 | | | 113 | 114 |

TABLE 8-continued

| | Electrolytic solution No. | Positive electrode Active material | Negative electrode Active material | Discharge capacity maintenance after 200 cycles* [%] | High power capacity maintenance* [%] |
|---|---|---|---|---|---|
| Comparative example 3-9 | No. 156 | | | 100 | 100 |
| Comparative example 3-10 | No. 157 | | | 102 | 102 |
| Comparative example 3-11 | No. 161 | | | 101 | 102 |
| Comparative example 3-12 | No. 162 | | | 101 | 100 |
| Example 3-22 | No. 1 | | Hard carbon | 113 | 115 |
| Example 3-23 | No. 12 | | | 111 | 114 |
| Example 3-24 | No. 13 | | | 107 | 106 |
| Example 3-25 | No. 16 | | | 110 | 110 |
| Example 3-26 | No. 17 | | | 110 | 112 |
| Example 3-27 | No. 21 | | | 112 | 113 |
| Example 3-28 | No. 22 | | | 111 | 111 |
| Comparative example 3-13 | No. 156 | | | 100 | 100 |
| Comparative example 3-14 | No. 157 | | | 101 | 101 |
| Comparative example 3-15 | No. 161 | | | 100 | 101 |
| Comparative example 3-16 | No. 162 | | | 100 | 100 |

*Relative value in each corresponding battery constitution, when the value of Comparative example in which Electrolytic solution No. 156 was used is designated as 100.

Examples 4-1 to 4-21, and Comparative Examples 4-1 to 4-12

As shown in Table 9, the electrolytic solutions for non-aqueous electrolyte batteries were prepared, the cells were produced, and the resultant batteries were evaluated in a manner similar to Example 1-1, except that the kinds of the positive electrodes and electrolytic solutions were varied. In this case, the positive electrode using $LiNi_{0.8}Co_{0.15}Al_{0.05}O_2$ as the active material was prepared by mixing 90 mass % of $LiNi_{0.8}Co_{0.15}Al_{0.05}O_2$ powder with 5 mass % of PVDF as a binder, and 5 mass % of acetylene black as a conductive material, further adding N-methylpyrrolidone thereto, applying the thus obtained paste onto an aluminum foil, and then drying the resultant material. When the resultant batteries were evaluated, the end-of-charge voltage was 4.3 V and the end-of-discharge voltage was 3.0 V.

Moreover, the positive electrode using $LiMn_2O_4$ as the active material was prepared by mixing 90 mass % of $LiMn_2O_4$ powder with 5 mass % of PVDF as a binder, and 5 mass % of acetylene black as a conductive material, further adding N-methylpyrrolidone thereto, applying the thus obtained paste onto an aluminum foil, and then drying the resultant material. When the resultant batteries were evaluated, the end-of-charge voltage was 4.2 V and the end-of-discharge voltage was 3.0 V.

Furthermore, the positive electrode using $LiFePO_4$ as the active material was prepared by mixing 90 mass % of $LiFePO_4$ powder coated with amorphous carbon with 5 mass % of PVDF as a binder, 5 mass % of acetylene black as a conductive material, further adding N-methylpyrrolidone thereto, applying the thus obtained paste onto an aluminum foil, and then drying the resultant. When the resultant batteries were evaluated, the end-of-charge voltage was 4.2 V and the end-of-discharge voltage was 2.5 V.

The evaluation results are shown in Table 9. In this case, the evaluation results of Examples 4-1 to 4-7 and Comparative examples 4-1 to 4-4 are indicated as relative values when the value of Comparative example 4-1 is designated as 100. Furthermore, the evaluation results of Examples 4-8 to 4-14 and Comparative examples 4-5 to 4-8 are indicated as relative values when the value of Comparative example 4-5 is designated as 100. Furthermore, the evaluation results of Examples 4-15 to 4-21 and Comparative examples 4-9 to 4-12 are indicated as relative values when the value of Comparative example 4-9 is designated as 100.

TABLE 9

| | Electrolytic solution No. | Positive electrode Active material | Negative electrode Active material | Discharge capacity maintenance after 200 cycles* [%] | High power capacity maintenance* [%] |
|---|---|---|---|---|---|
| Example 4-1 | No. 1 | $LiNi_{0.8}Co_{0.15}Al_{0.05}O_2$ | Graphite | 118 | 124 |
| Example 4-2 | No. 12 | | | 117 | 122 |
| Example 4-3 | No. 13 | | | 111 | 110 |
| Example 4-4 | No. 16 | | | 117 | 115 |
| Example 4-5 | No. 17 | | | 114 | 121 |
| Example 4-6 | No. 21 | | | 114 | 123 |
| Example 4-7 | No. 22 | | | 115 | 119 |
| Comparative example 4-1 | No. 156 | | | 100 | 100 |
| Comparative example 4-2 | No. 157 | | | 101 | 102 |
| Comparative example 4-3 | No. 161 | | | 101 | 101 |
| Comparative example 4-4 | No. 162 | | | 100 | 100 |
| Example 4-8 | No. 1 | $LiMn_2O_4$ | Graphite | 121 | 129 |
| Example 4-9 | No. 12 | | | 118 | 127 |
| Example 4-10 | No. 13 | | | 115 | 112 |
| Example 4-11 | No. 16 | | | 118 | 118 |
| Example 4-12 | No. 17 | | | 117 | 125 |
| Example 4-13 | No. 21 | | | 119 | 125 |
| Example 4-14 | No. 22 | | | 120 | 121 |
| Comparative example 4-5 | No. 156 | | | 100 | 100 |
| Comparative example 4-6 | No. 157 | | | 102 | 103 |
| Comparative example 4-7 | No. 161 | | | 102 | 102 |
| Comparative example 4-8 | No. 162 | | | 100 | 101 |
| Example 4-15 | No. 1 | $LiFePO_4$ | Graphite | 112 | 114 |
| Example 4-16 | No. 12 | | | 107 | 113 |
| Example 4-17 | No. 13 | | | 105 | 105 |
| Example 4-18 | No. 16 | | | 107 | 108 |
| Example 4-19 | No. 17 | | | 107 | 110 |
| Example 4-20 | No. 21 | | | 109 | 110 |
| Example 4-21 | No. 22 | | | 109 | 108 |
| Comparative example 4-9 | No. 156 | | | 100 | 100 |

TABLE 9-continued

| | Electrolytic solution No. | Positive electrode Active material | Negative electrode Active material | Discharge capacity maintenance after 200 cycles* [%] | High power capacity maintenance* [%] |
|---|---|---|---|---|---|
| Comparative example 4-10 | No. 157 | | | 101 | 101 |
| Comparative example 4-11 | No. 161 | | | 100 | 101 |
| Comparative example 4-12 | No. 162 | | | 100 | 100 |

*Relative value in each corresponding battery constitution, when the value of Comparative example in which Electrolytic solution No. 156 was used is designated as 100.

It was confirmed from the results in Table 7 to Table 9 that, regardless of the kinds of the active materials of negative electrodes or the active materials of positive electrodes, the addition of the above salts having the divalent imide anions into the electrolytic solutions provides a good high-temperature cycle characteristic and a good low-temperature output characteristic and the effects similar to the above were obtained, when the electrolytic solutions were used in non-aqueous electrolyte batteries.

Example 5-1

With the use of a mixed solvent of ethylene carbonate and diethyl carbonate at a volume ratio of 1:1 as a non-aqueous solvent, $NaPF_6$ was dissolved as a solute to a concentration of 1.0 mol/L, and the disodium salt of the above Compound No. 1 as a salt having an imide anion was dissolved to a concentration of 0.1 mass % into the solvent. The electrolytic solutions for non-aqueous electrolyte batteries were prepared as shown in Table 10. In this case, the above preparation was performed while maintaining the liquid temperature at 25° C.

The cells were produced using the electrolytic solutions in a manner similar to Example 1-1, except that $NaFe_{0.5}Co_{0.5}O_2$ was used as a positive electrode material and hard carbon was used as a negative electrode material. The resultant batteries were evaluated in a manner similar to Example 1-1. In this case, the positive electrode using $NaFe_{0.5}Co_{0.5}O_2$ as the active material was prepared by mixing 90 mass % of $NaFe_{0.5}CO_{0.6}O_2$ powder, 5 mass % of PVDF as a binder, and 5 mass % of acetylene black as a conductive material, further adding N-methylpyrrolidone thereto, applying the thus obtained paste onto an aluminum foil, and then drying the resultant. When the resultant batteries were evaluated, the end-of-charge voltage was 3.8 V and the end-of-discharge voltage was 1.5 V. The evaluation results are shown in Table 11.

Examples 5-2 to 5-14, and Comparative Examples 5-1 to 5-5

As shown in Table 10, the electrolytic solutions for non-aqueous electrolyte batteries were prepared in a manner similar to Example 5-1, except that the kinds and concentrations of the solutes, and the kinds and concentrations of the salts having the imide anions were varied, the cells were produced, and then the resultant batteries were evaluated. The evaluation results are shown in Table 11. In addition, the evaluation results of Examples 5-1 to 5-14, and Comparative examples 5-1 to 5-5 are indicated as relative values when the value of comparative example 5-1 is designated as 100.

TABLE 10

| | Solute 1 | | Solute 2 | | Salt having imide anion | | |
|---|---|---|---|---|---|---|---|
| | Kind | Concentration [mol/L] | Kind | Concentration [mol/L] | Compound No. | Counter cation | Concentration [mass %] |
| Electrolytic solution No. 173 | $NaPF_6$ | 1.0 | None | 0 | No. 1 | $2Na^+$ | 0.1 |
| Electrolytic solution No. 174 | | | | | No. 6 | | 0.1 |
| Electrolytic solution No. 175 | | | | | No. 7 | | 0.1 |
| Electrolytic solution No. 176 | | | | | No. 10 | | 0.1 |
| Electrolytic solution No. 177 | | | | | No. 11 | | 0.1 |
| Electrolytic solution No. 178 | | | | | No. 15 | | 0.1 |

TABLE 10-continued

| | Solute 1 | | Solute 2 | | Salt having imide anion | | |
|---|---|---|---|---|---|---|---|
| | Kind | Concentration [mol/L] | Kind | Concentration [mol/L] | Compound No. | Counter cation | Concentration [mass %] |
| Electrolytic solution No. 179 | | | | | No. 16 | | 0.1 |
| Electrolytic solution No. 180 | | | NaPF$_4$(C$_2$O$_4$) | 0.1 | No. 1 | 2Na$^+$ | 0.1 |
| Electrolytic solution No. 181 | | | | 0.1 | No. 6 | | 0.1 |
| Electrolytic solution No. 182 | | | | 0.1 | No. 7 | | 0.1 |
| Electrolytic solution No. 183 | | | | 0.1 | No. 10 | | 0.1 |
| Electrolytic solution No. 184 | | | | 0.1 | No. 11 | | 0.1 |
| Electrolytic solution No. 185 | | | | 0.1 | No. 15 | | 0.1 |
| Electrolytic solution No. 186 | | | | 0.1 | No. 16 | | 0.1 |
| Electrolytic solution No. 187 | | | None | 0 | None | — | 0 |
| Electrolytic solution No. 188 | | | | | No. 19 | Na$^+$ | 0.1 |
| Electrolytic solution No. 189 | | | | | No. 23 | | 0.1 |
| Electrolytic solution No. 190 | | | | | No. 24 | | 0.1 |
| Electrolytic solution No. 191 | | | NaPF$_4$(C$_2$O$_4$) | 0.1 | None | — | 0 |

TABLE 11

| | Electrolytic solution No. | Positive electrode Active material | Negative electrode Active material | Discharge capacity maintenance after 200 cycles* [%] | High power capacity maintenance* [%] |
|---|---|---|---|---|---|
| Example 5-1 | No. 173 | NaFe$_{0.5}$Co$_{0.5}$O$_2$ | Hard carbon | 109 | 110 |
| Example 5-2 | No. 174 | | | 106 | 108 |
| Example 5-3 | No. 175 | | | 103 | 104 |
| Example 5-4 | No. 176 | | | 105 | 107 |
| Example 5-5 | No. 177 | | | 105 | 109 |
| Example 5-6 | No. 178 | | | 106 | 110 |
| Example 5-7 | No. 179 | | | 107 | 108 |
| Example 5-8 | No. 180 | | | 119 | 116 |
| Example 5-9 | No. 181 | | | 117 | 114 |
| Example 5-10 | No. 182 | | | 113 | 110 |
| Example 5-11 | No. 183 | | | 116 | 114 |

TABLE 11-continued

|  | Electrolytic solution No. | Positive electrode Active material | Negative electrode Active material | Discharge capacity maintenance after 200 cycles* [%] | High power capacity maintenance* [%] |
|---|---|---|---|---|---|
| Example 5-12 | No. 184 | | | 117 | 115 |
| Example 5-13 | No. 185 | | | 117 | 116 |
| Example 5-14 | No. 186 | | | 118 | 114 |
| Comparative example 5-1 | No. 187 | | | 100 | 100 |
| Comparative example 5-2 | No. 188 | | | 102 | 102 |
| Comparative example 5-3 | No. 189 | | | 101 | 101 |
| Comparative example 5-4 | No. 190 | | | 101 | 100 |
| Comparative example 5-5 | No. 191 | | | 111 | 106 |

*Relative value when the result of Comparative example 5-1 is designated as 100.

It was confirmed from the results in Table 11 that even in the case of sodium ion batteries, both a high-temperature cycle characteristic and a low-temperature output characteristic were improved in Examples 5-1 to 5-7 in which the above salts having divalent imide anions were added to the electrolytic solutions, as compared with Comparative example 5-1 in which no such salt was added.

It was similarly confirmed that a high-temperature cycle characteristic and a low-temperature output characteristic were improved in Examples 5-1 to 5-7 in which the salts having the divalent imide anions of the present invention were contained at the same concentration (0.1 mass %), as compared with Comparative examples 5-2 to 5-4 in which salts having monovalent imide anions were used.

Furthermore, it was confirmed that also in the case of sodium ion batteries, the use of the salt having an imide anion with a P—F bond or an S—F bond provides a better low-temperature output characteristic. It was also confirmed that the higher the number of P—F bonds or S—F bonds in the above salts having imide anions, the more the low-temperature characteristic is improved.

Furthermore, it was confirmed that the use of the salt having a divalent imide anion wherein $R^1$ to $R^3$ in the general formula (1) or (3) are a fluorine atom or an organic group selected from the group consisting of an alkenyloxy group and an alkynyloxy group provides a better high-temperature cycle characteristic.

Furthermore, it was confirmed that the use of the salt having a divalent imide anion wherein X in the general formula (2) or (4) is a fluorine atom or an organic group selected from the group consisting of an alkoxy group, an alkenyloxy group, and an alkynyloxy group provides a better high-temperature cycle characteristic.

Furthermore, it was confirmed that also in the case of mixing $NaPF_6$ with another solute, a high-temperature cycle characteristic and a low-temperature output characteristic were improved in Examples 5-8 to 5-14 in which the salts having divalent imide anions were added, as compared with Comparative example 5-5 in which no such salt having a divalent imide anion was added, and accordingly the similar effects were obtained.

What is claimed is:

1. An electrolytic solution for a non-aqueous electrolyte battery, comprising a non-aqueous solvent, a solute, and at least one salt having a divalent imide anion represented by any one of the following general formulae (1) to (4):

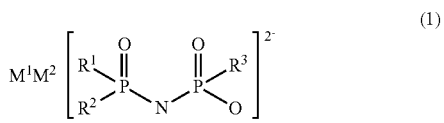

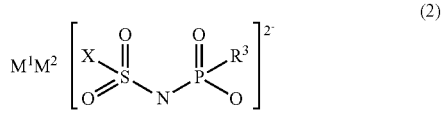

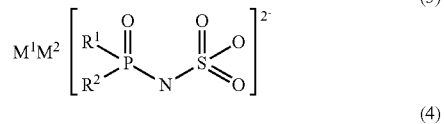

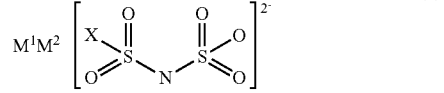

wherein:
in formulae (1) to (3), $R^1$ to $R^3$ each independently represent a fluorine atom or an organic group selected from a linear or branched C1-10 alkoxy group, a C2-10 alkenyloxy group, a C2-10 alkynyloxy group, a C3-10 cycloalkoxy group, a C3-10 cycloalkenyloxy group and a C6-10 aryloxy group, wherein a fluorine atom, an oxygen atom or an unsaturated bond may also be present in the organic group;

in formulae (2) and (4), X represents a fluorine atom or an organic group selected from a linear or branched C1-10 alkyl group, a C2-10 alkenyl group, a C2-10 alkynyl group, a C3-10 cycloalkyl group, a C3-10 cycloalkenyl group, a C6-10 aryl group, a linear or branched C1-10 alkoxy group, a C2-10 alkenyloxy group, a C2-10 alkynyloxy group, a C3-10 cycloalkoxy group, a C3-10 cycloalkenyloxy group and a C6-10 aryloxy group, wherein a fluorine atom, an oxygen atom, or an unsaturated bond may also be present in the organic group; and $M^1$ and $M^2$ each independently represent a proton, a metal cation or an onium cation.

2. The electrolytic solution according to claim 1, wherein said salt has at least one P—F bond or S—F bond.

3. The electrolytic solution according to claim 1, wherein said $R^1$ to $R^3$ represent a fluorine atom or an organic group selected from the group consisting of a C2-10 alkenyloxy group and a C2-10 alkynyloxy group.

4. The electrolytic solution according to claim 3, wherein said alkenyloxy group is selected from the group consisting of a 1-propenyloxy group, a 2-propenyloxy group, and a 3-butenyloxy group, and said alkynyloxy group is selected from the group consisting of a 2-propynyloxy group, and 1,1-dimethyl-2-propynyloxy group.

5. The electrolytic solution according to claim 1, wherein said X is a fluorine atom or an organic group selected from the group consisting of a C1-10 alkoxy group, a C2-10 alkenyloxy group and a C2-10 alkynyloxy group.

6. The electrolytic solution according to claim 5, wherein said alkoxy group is selected from the group consisting of a methoxy group, an ethoxy group and a propoxy group; said alkenyloxy group is selected from the group consisting of a 1-propenyloxy group, a 2-propenyloxy group and a 3-butenyloxy group; and said alkynyloxy group is selected from the group consisting of a 2-propynyloxy group and a 1,1-dimethyl-2-propynyloxy group.

7. The electrolytic solution according to claim 1, wherein the counter cations $M^1$ and $M^2$ of the imide anion in said salt represent at least one cation selected from the group consisting of a proton, a lithium ion, a sodium ion, a potassium ion, a tetraalkylammonium ion, and a tetraalkylphosphonium ion.

8. The electrolytic solution according to claim 7, wherein the concentration of said salt ranges from 0.01 to 5.0 mass % relative to the total amount of the electrolytic solution.

9. The electrolytic solution according to claim 8, wherein said solute is at least one solute selected from the group consisting of $LiPF_6$, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiBF_4$, $NaPF_6$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaN(CF_3SO_2)_2$ and $NaBF_4$.

10. The electrolytic solution according to claim 9, wherein said non-aqueous solvent is at least one non-aqueous solvent selected from the group consisting of a cyclic carbonate, a linear carbonate, a cyclic ester, a linear ester, a cyclic ether, a linear ether, a sulfone compound, a sulfoxide compound and an ionic liquid.

11. A non-aqueous electrolyte battery comprising at least a positive electrode, a negative electrode, and the electrolytic solution for a non-aqueous electrolyte battery according to claim 1.

* * * * *